(12) United States Patent
Song et al.

(10) Patent No.: US 12,138,957 B2
(45) Date of Patent: Nov. 12, 2024

(54) DECORATION MEMBER AND MANUFACTURING METHOD THEREFOR

(71) Applicant: LG CHEM, LTD., Seoul (KR)

(72) Inventors: Jin Suk Song, Daejeon (KR); Sangcholl Han, Daejeon (KR); Yong Chan Kim, Daejeon (KR); Nansra Heo, Daejeon (KR); Jeong Woo Shon, Daejeon (KR); Pilsung Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 283 days.

(21) Appl. No.: 16/960,371

(22) PCT Filed: Jan. 8, 2019

(86) PCT No.: PCT/KR2019/000273
§ 371 (c)(1),
(2) Date: Jul. 7, 2020

(87) PCT Pub. No.: WO2019/135667
PCT Pub. Date: Jul. 11, 2019

(65) Prior Publication Data
US 2021/0061000 A1 Mar. 4, 2021

(30) Foreign Application Priority Data
Jan. 8, 2018 (KR) ........................ 10-2018-0002278

(51) Int. Cl.
*B44F 1/02* (2006.01)
*B44F 1/08* (2006.01)

(52) U.S. Cl.
CPC . *B44F 1/02* (2013.01); *B44F 1/08* (2013.01)

(58) Field of Classification Search
CPC ...... B44F 1/02; B44F 1/08; B44F 1/04; B44F 1/14; B32B 3/30; B32B 7/023; B32B 15/04; B32B 15/20; C09D 5/29; C03C 17/3626; G02B 5/003; G02B 5/32
See application file for complete search history.

(56) References Cited

U.S. PATENT DOCUMENTS

| | | | |
|---|---|---|---|
| 3,338,730 A * | 8/1967 | Slade | G02B 5/136 359/582 |
| 9,880,332 B2 | 1/2018 | Krishnan et al. | |
| 10,302,956 B2 | 5/2019 | Shin | |
| 2003/0031842 A1* | 2/2003 | Marietti | B32B 17/10339 428/432 |
| 2005/0175715 A1* | 8/2005 | Monroe | A61K 31/506 514/642 |
| 2006/0285184 A1 | 12/2006 | Phillips et al. | |

(Continued)

FOREIGN PATENT DOCUMENTS

| | | |
|---|---|---|
| CN | 2056903 U | 5/1990 |
| CN | 102971862 A | 3/2013 |

(Continued)

*Primary Examiner* — Nancy R Johnson
(74) *Attorney, Agent, or Firm* — BRYAN CAVE LEIGHTON PAISNER LLP

(57) ABSTRACT

Provided is a decorative member including a substrate and a decorative layer provided on the substrate, wherein the decorative member has a depth parameter value $\delta_{1m}$ represented by Formula 1 of 0.15 or more.

20 Claims, 24 Drawing Sheets

(a)

Left-side view   Right-side view (b)

(56) References Cited

U.S. PATENT DOCUMENTS

| | | |
|---|---|---|
| 2013/0034693 A1 | 2/2013 | Fujii et al. |
| 2013/0048072 A1 | 2/2013 | Choi |
| 2015/0212244 A1* | 7/2015 | Kim ................ C23C 28/34 204/192.28 |
| 2017/0217123 A1 | 8/2017 | Kataoka et al. |
| 2019/0098946 A1* | 4/2019 | Bee ................ A43B 23/24 |
| 2019/0099967 A1 | 4/2019 | Bee et al. |
| 2021/0061000 A1 | 3/2021 | Song et al. |

FOREIGN PATENT DOCUMENTS

| | | |
|---|---|---|
| EP | 1162059 A2 | 12/2001 |
| EP | 3202565 A1 | 8/2017 |
| EP | 3647053 A1 | 5/2020 |
| JP | 2000047613 A | 2/2000 |
| JP | 2000-211062 A | 8/2000 |
| JP | 2001-105526 A | 4/2001 |
| JP | 2006-88506 A | 4/2006 |
| JP | 2006-350355 A | 12/2006 |
| JP | 2008-083599 A | 4/2008 |
| JP | 2008-0096820 A | 4/2008 |
| JP | 2009083183 A | 4/2009 |
| JP | 2009-269222 A | 11/2009 |
| JP | 2010082912 A | 4/2010 |
| JP | 2010197798 A | 9/2010 |
| JP | 2011170295 A | 9/2011 |
| JP | 2013037040 A | 2/2013 |
| JP | 2015533678 A | 11/2015 |
| JP | 2017-185782 A | 10/2017 |
| JP | 2017220150 A | 12/2017 |
| KR | 10-2015-0089952 A | 8/2015 |
| KR | 10-2016-0067139 A | 6/2016 |
| KR | 10-2017-0063510 A | 6/2017 |
| KR | 101874282 B1 | 7/2018 |
| TW | 200944394 A1 | 11/2009 |
| WO | 2008-048870 A | 4/2008 |

* cited by examiner

[FIG. 1]
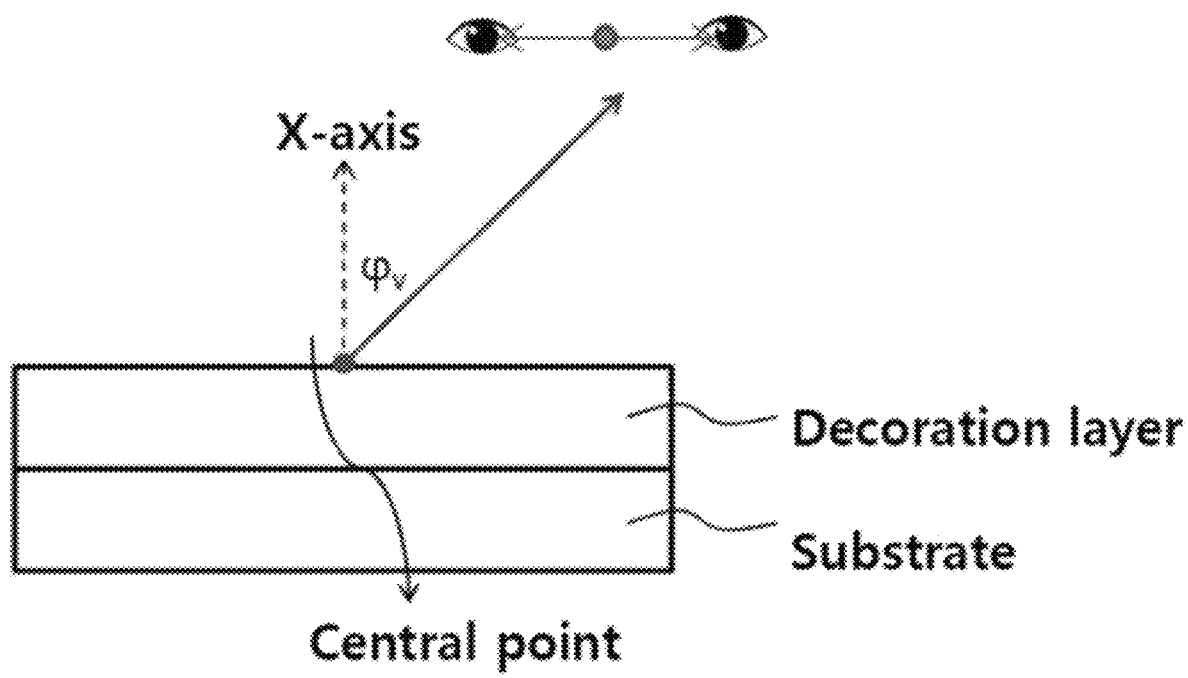

[FIG. 2]
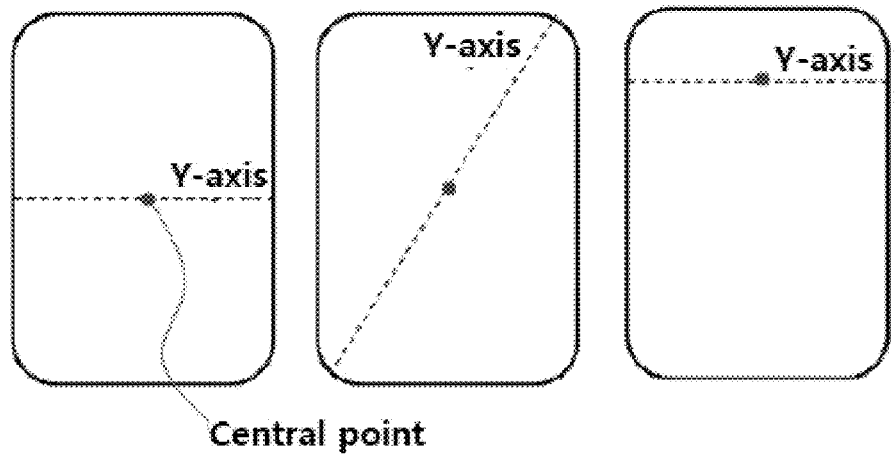
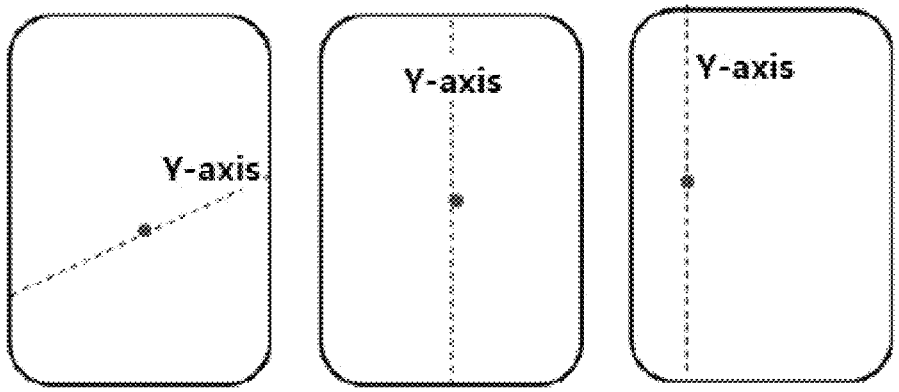

[FIG. 3]
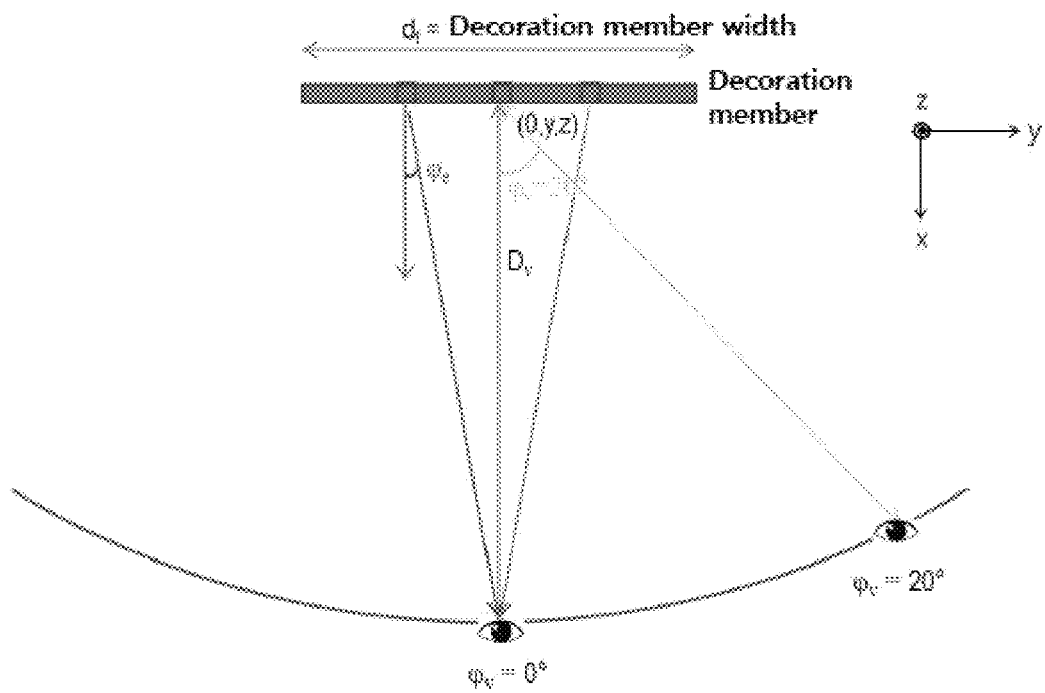
[FIG. 4]
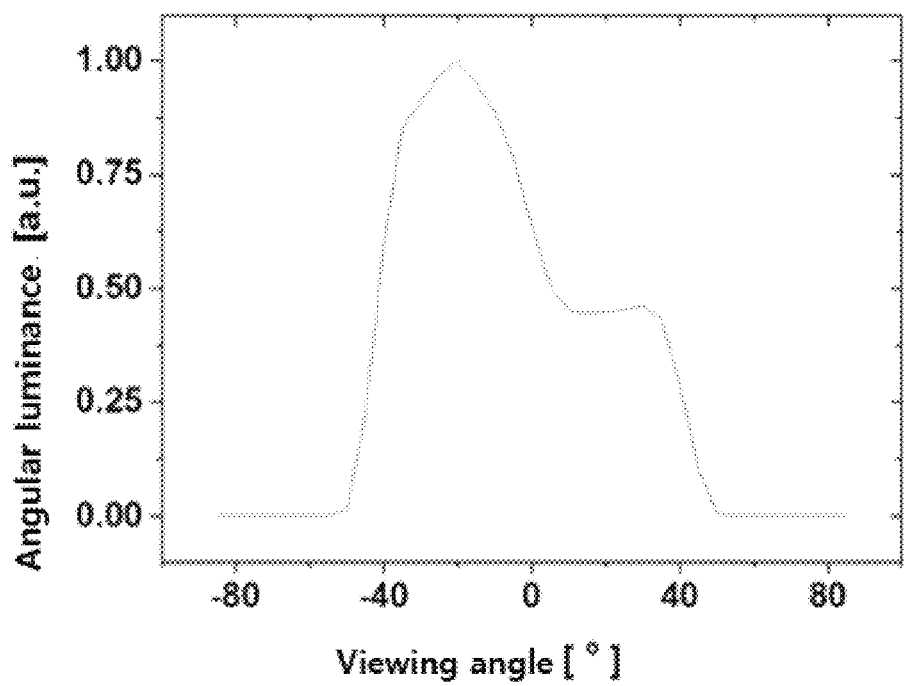

[FIG. 5]
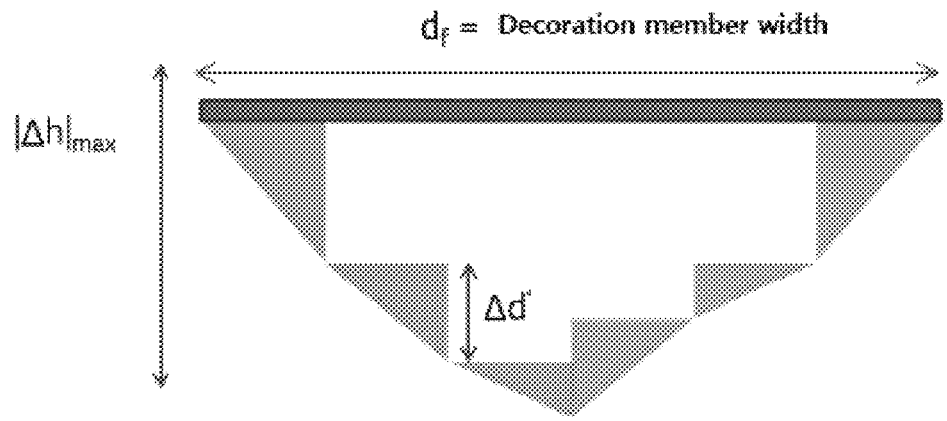
[FIG. 6]
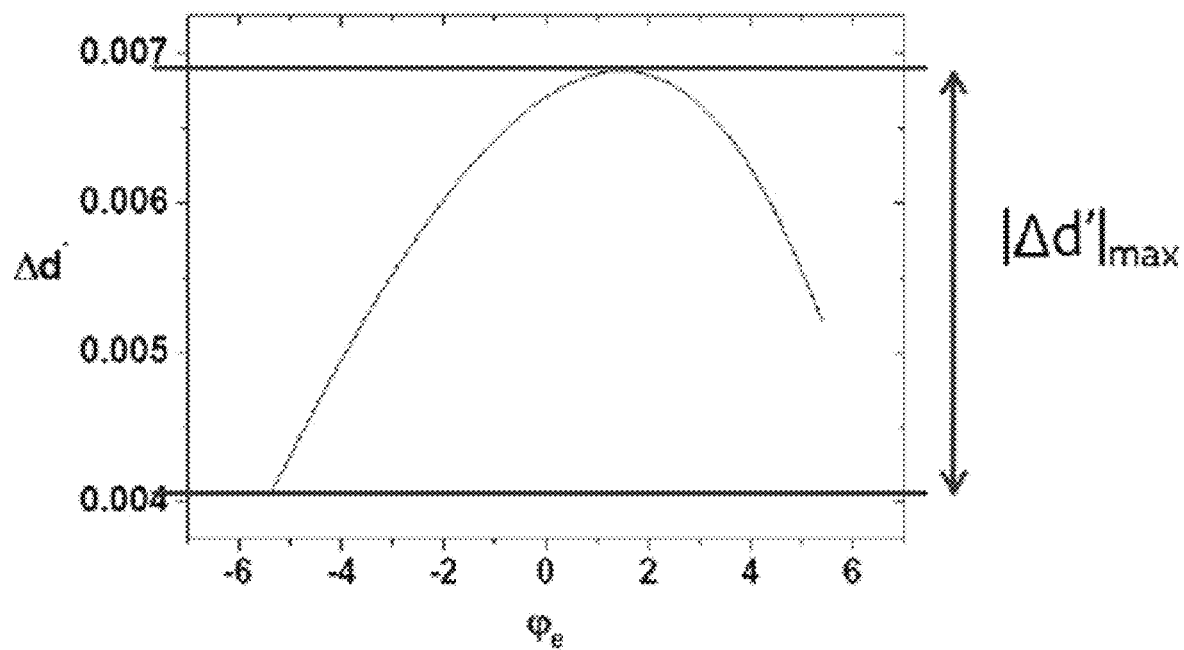

[FIG. 7]
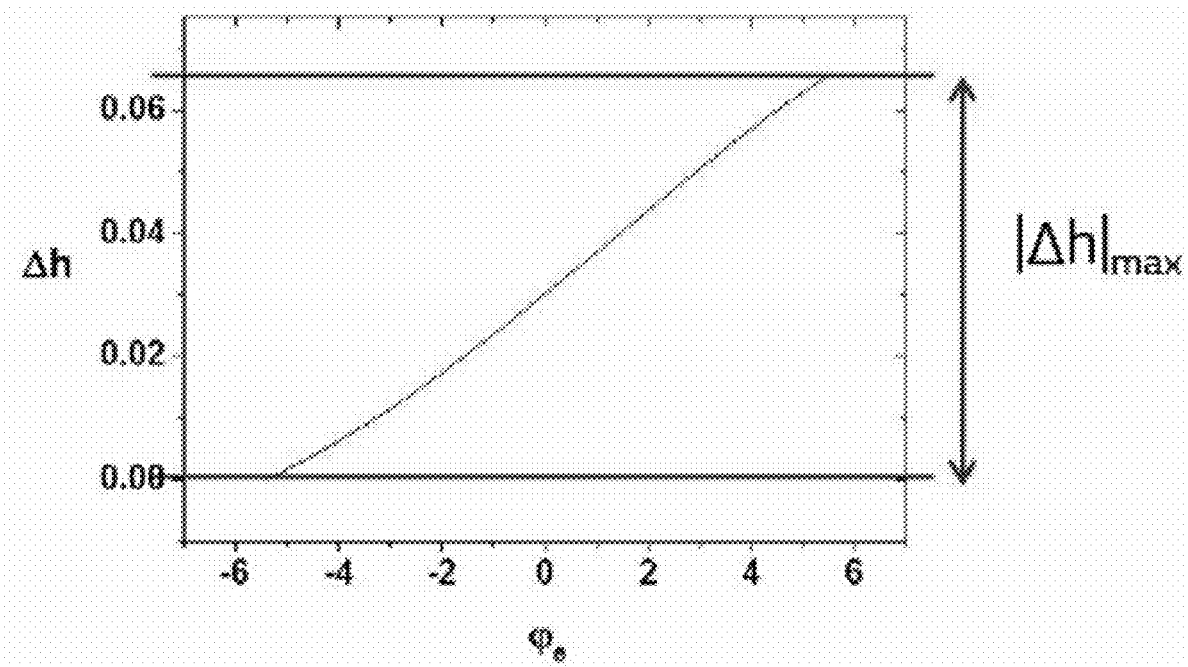
[FIG. 8]
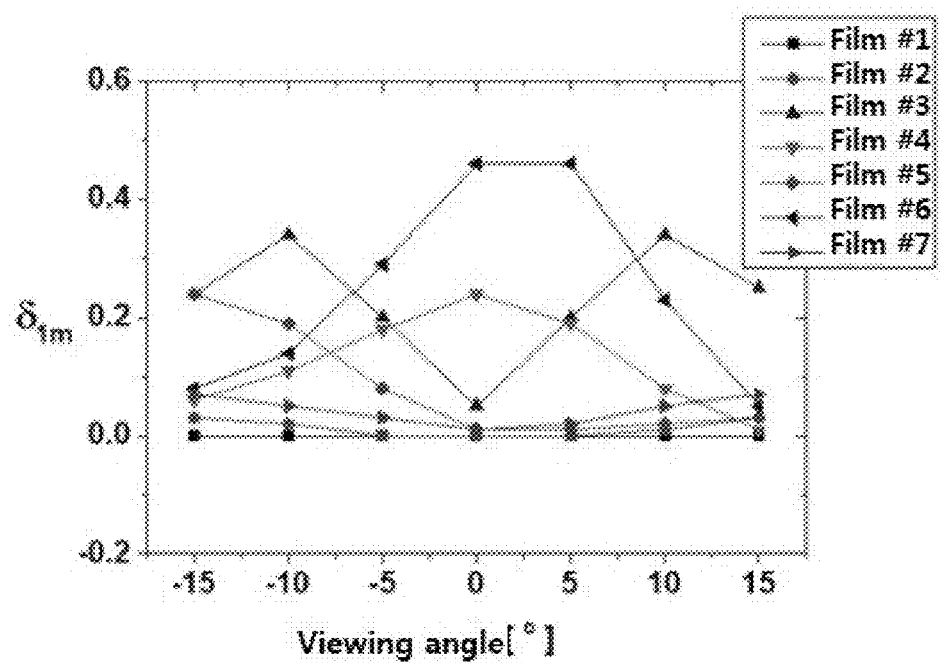

[FIG. 9]
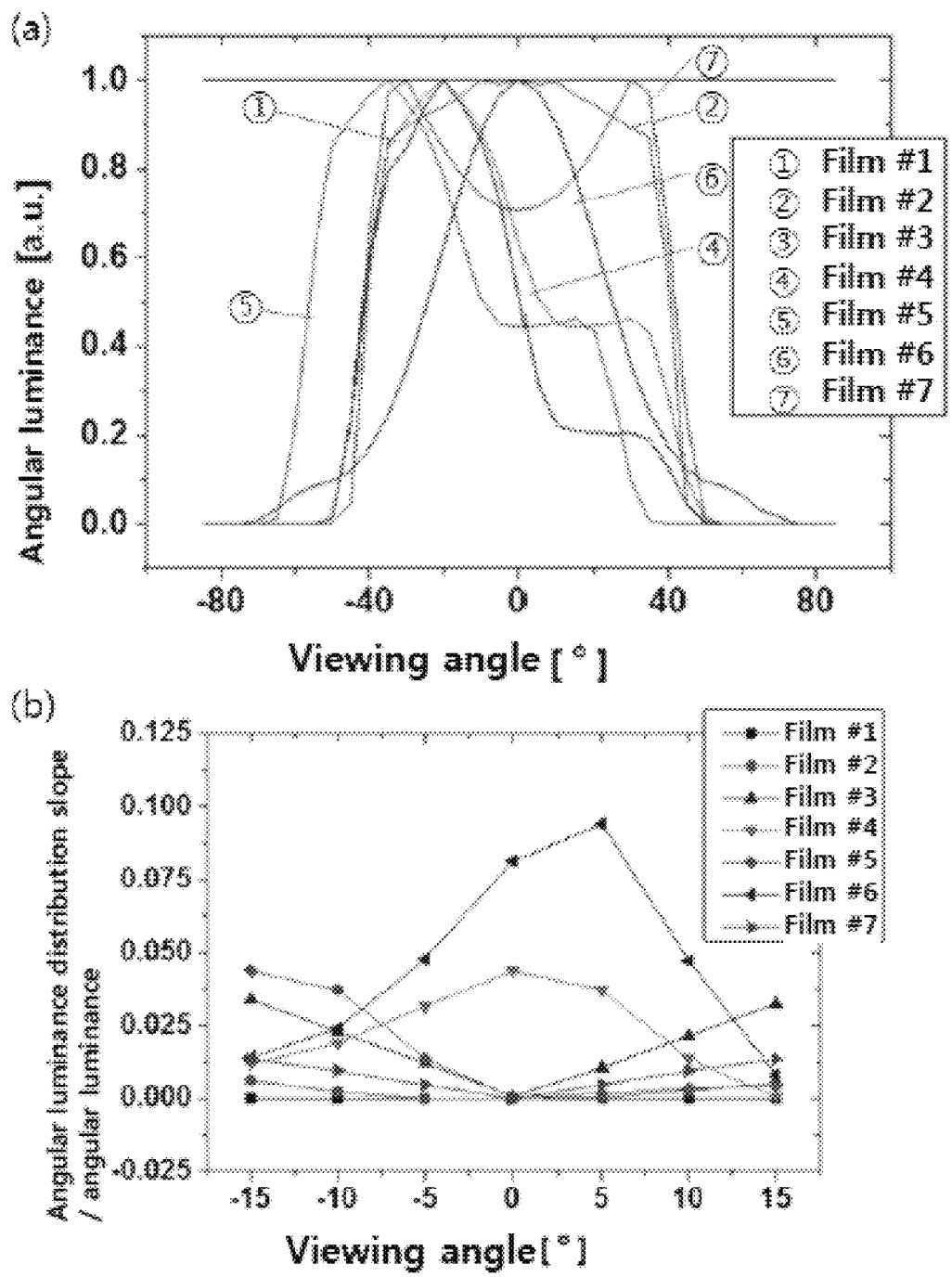

[FIG. 10]
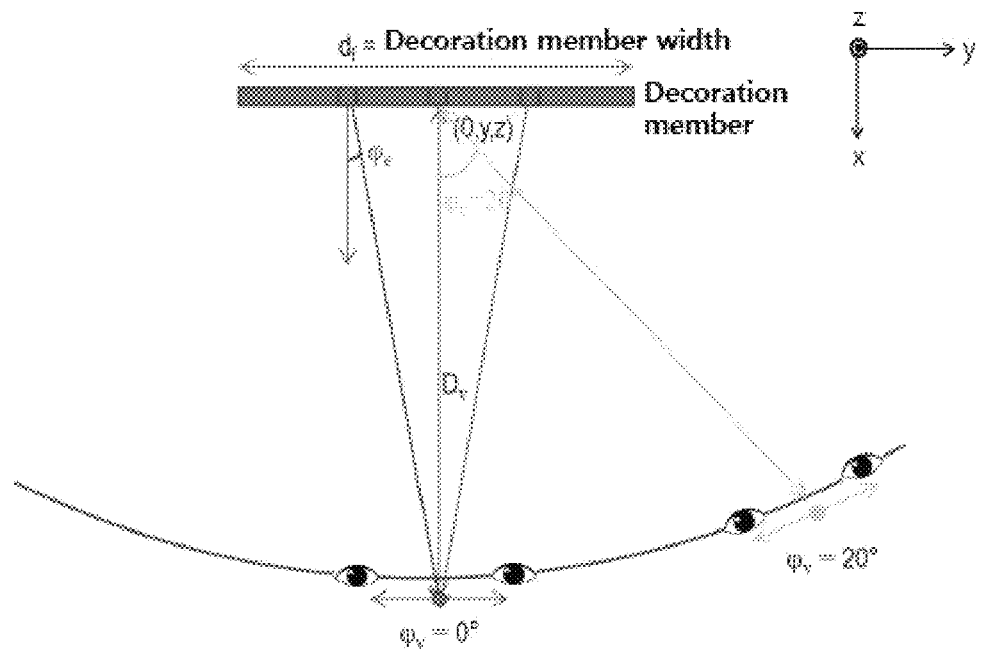
[FIG. 11]
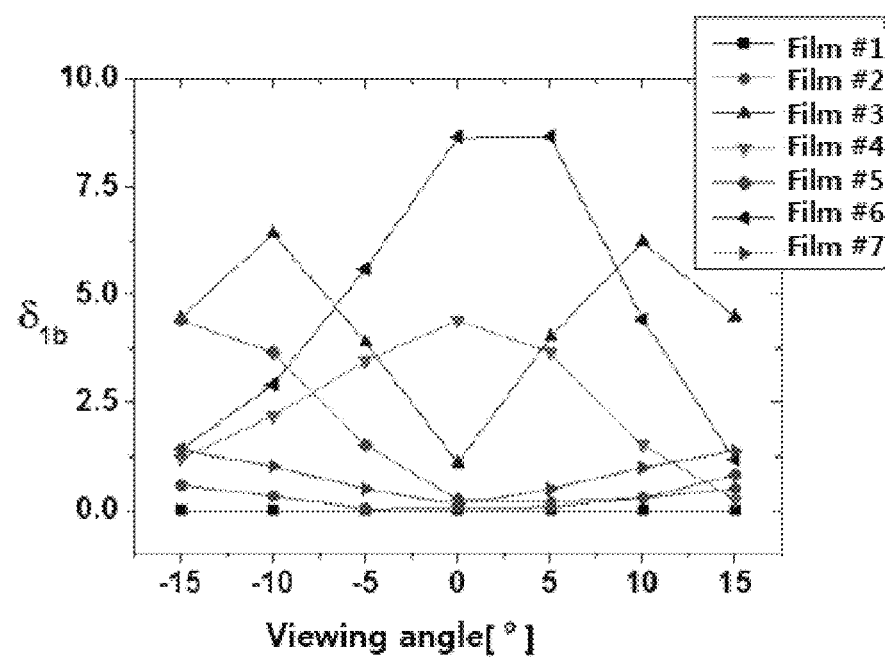

[FIG. 12]
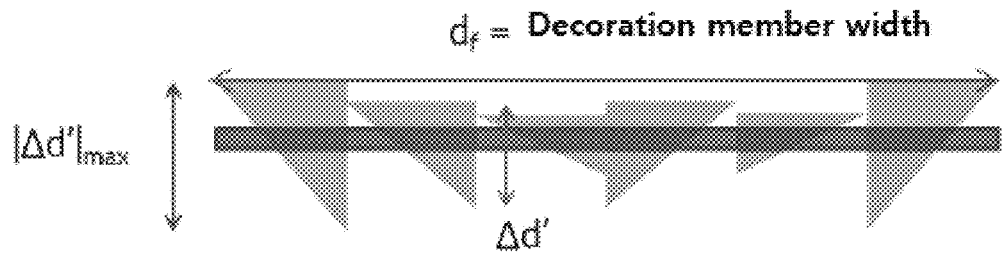
[FIG. 13]
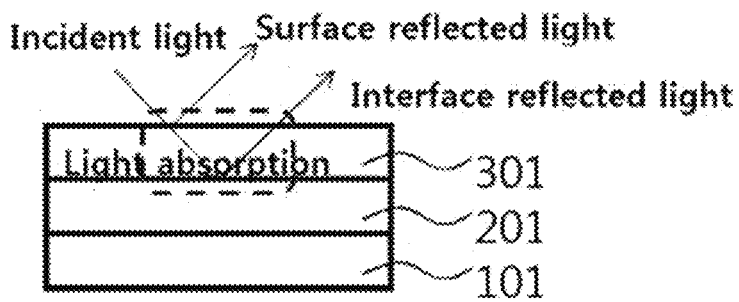
[FIG. 14]
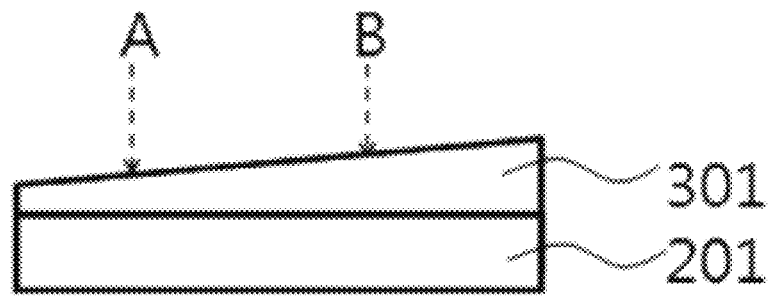
[FIG. 15]
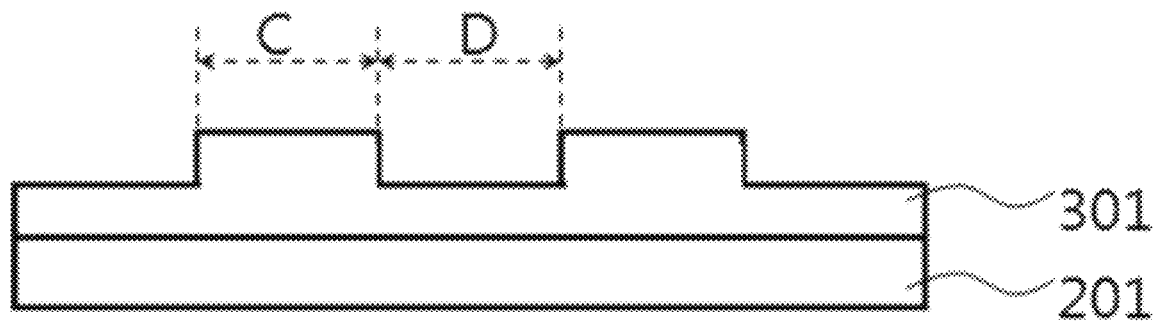

[FIG. 16]
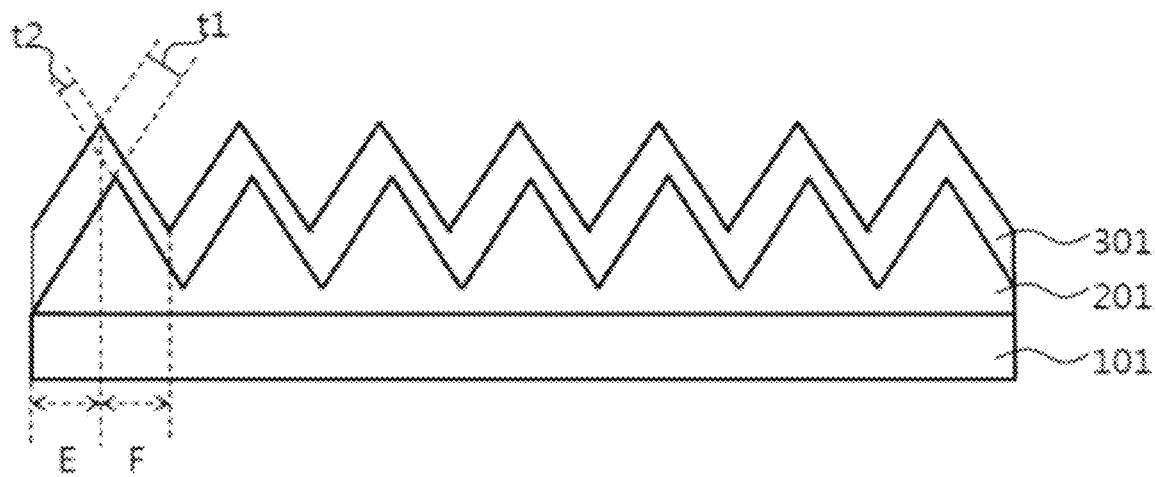
[FIG. 17]
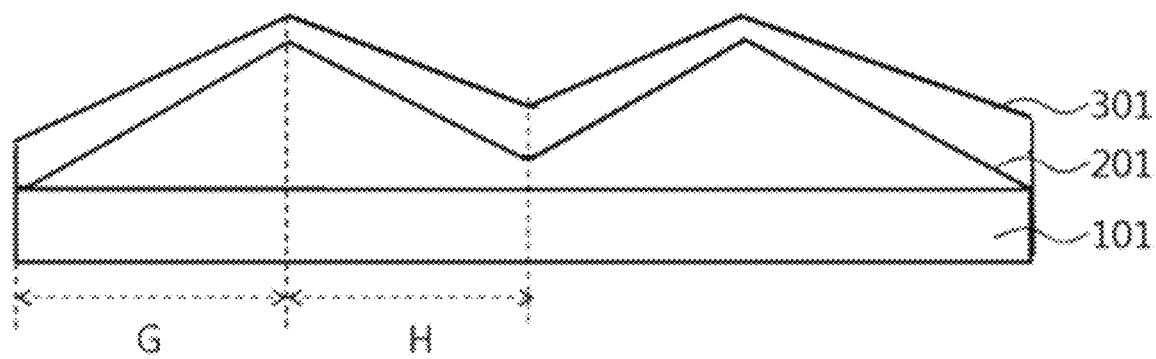
[FIG. 18]
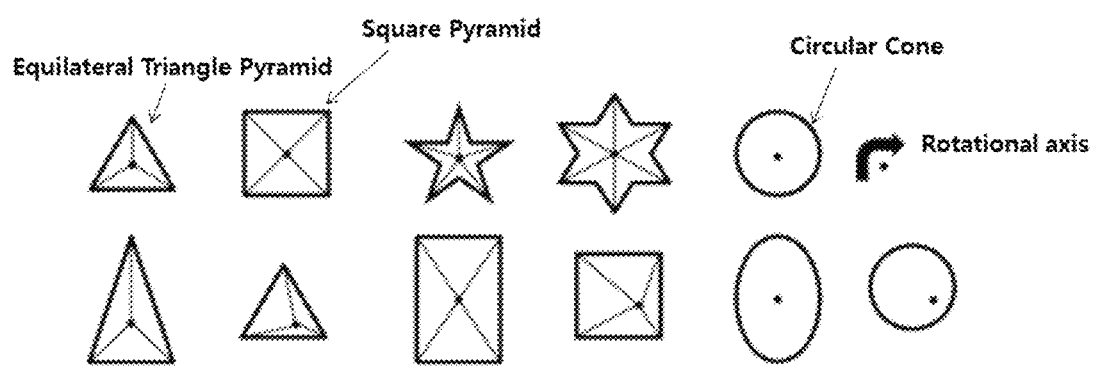

[FIG. 19]
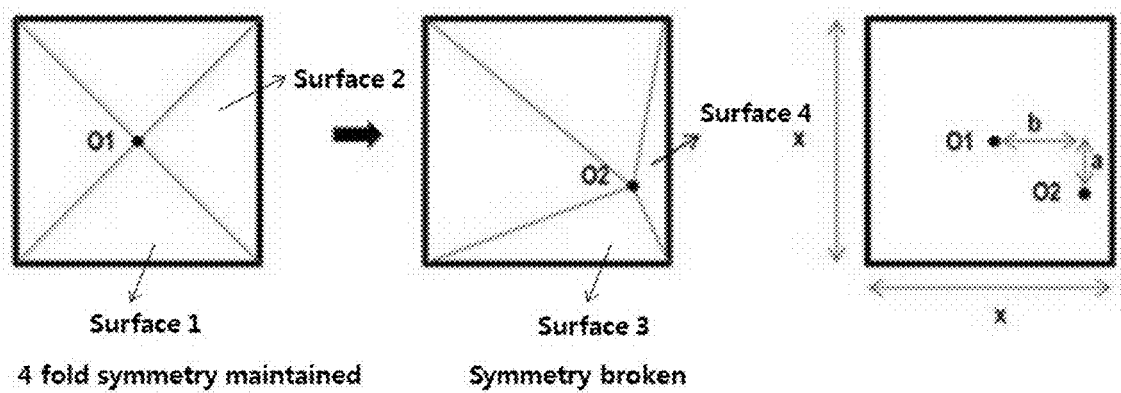
[FIG. 20]
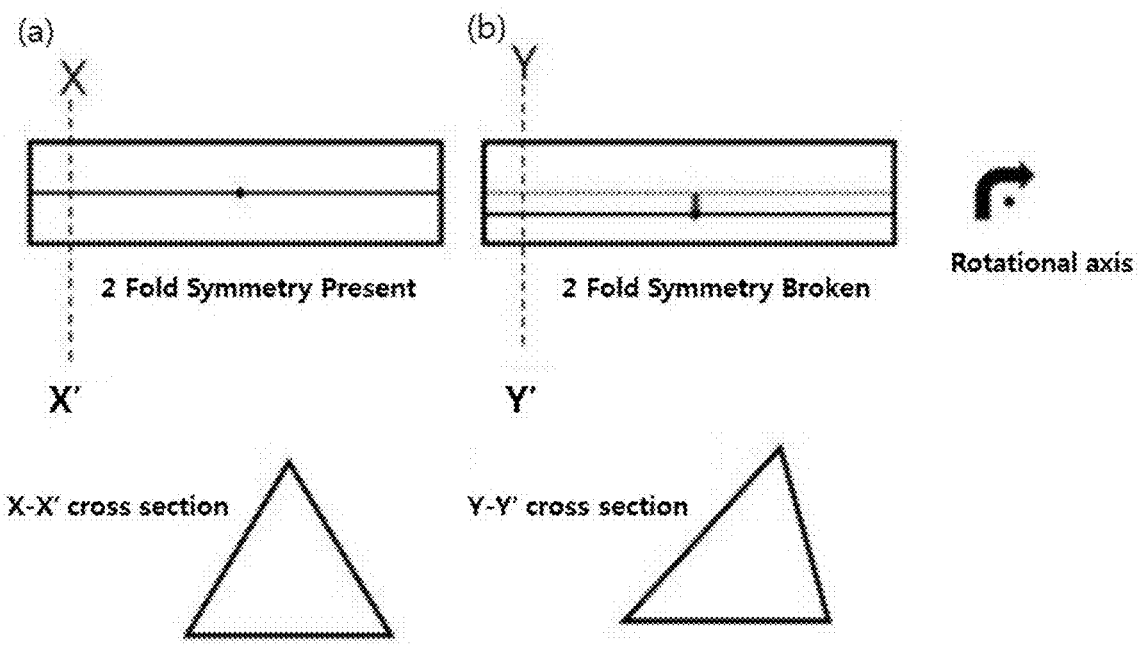

[FIG. 21]
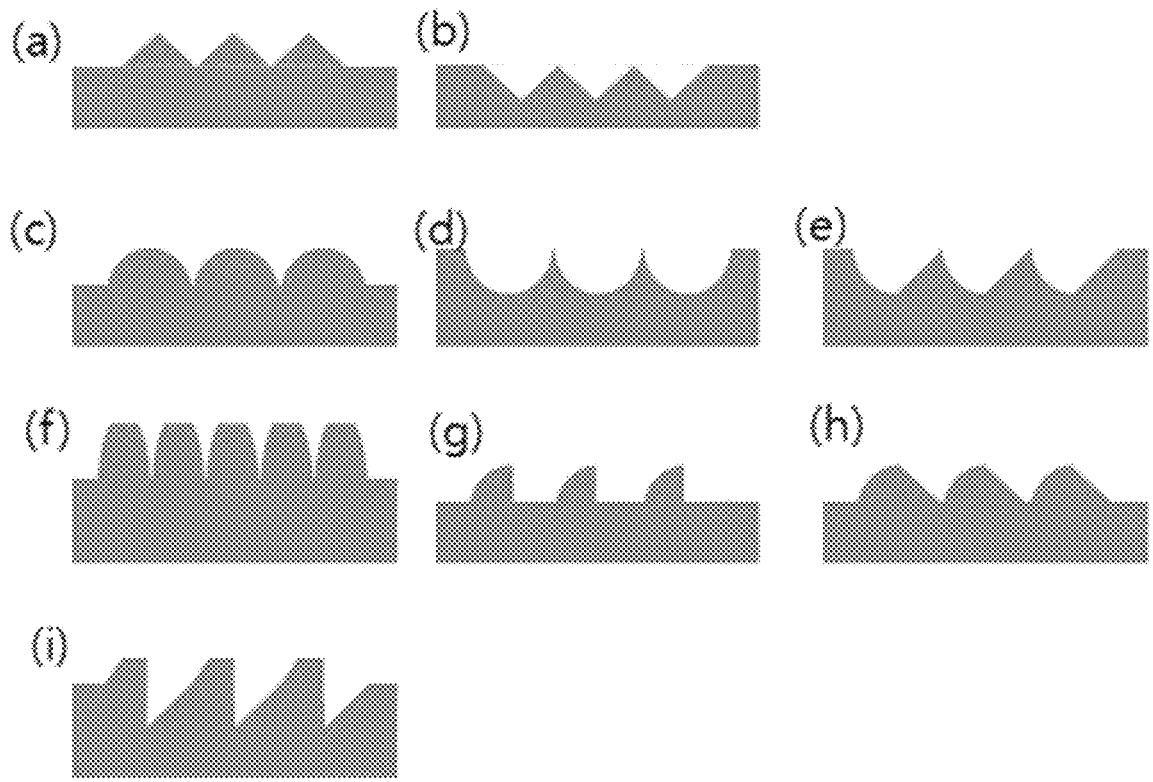
[FIG. 22]
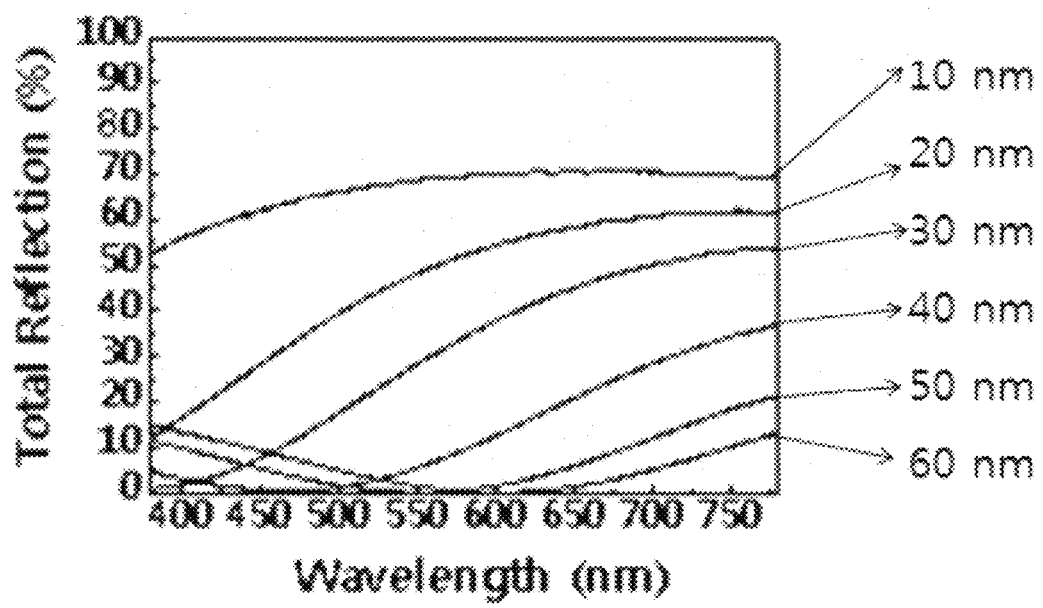

[FIG. 23]
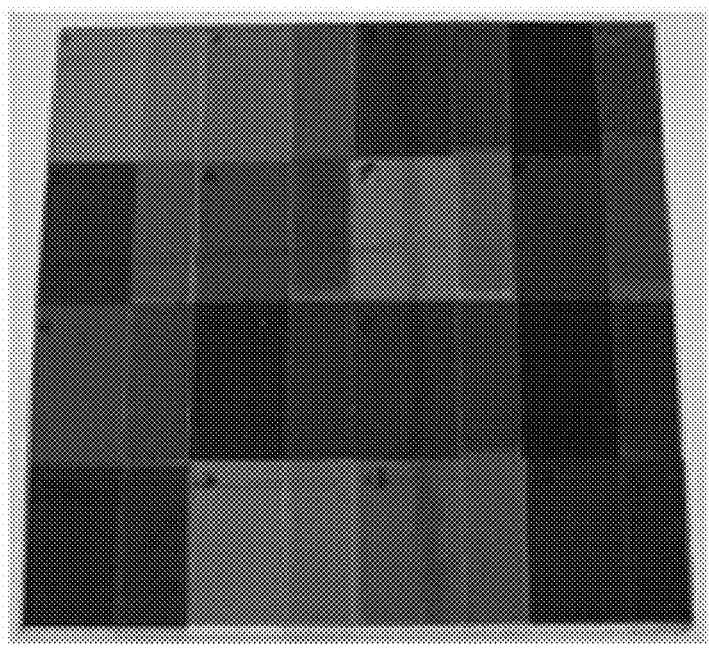
[FIG. 24]
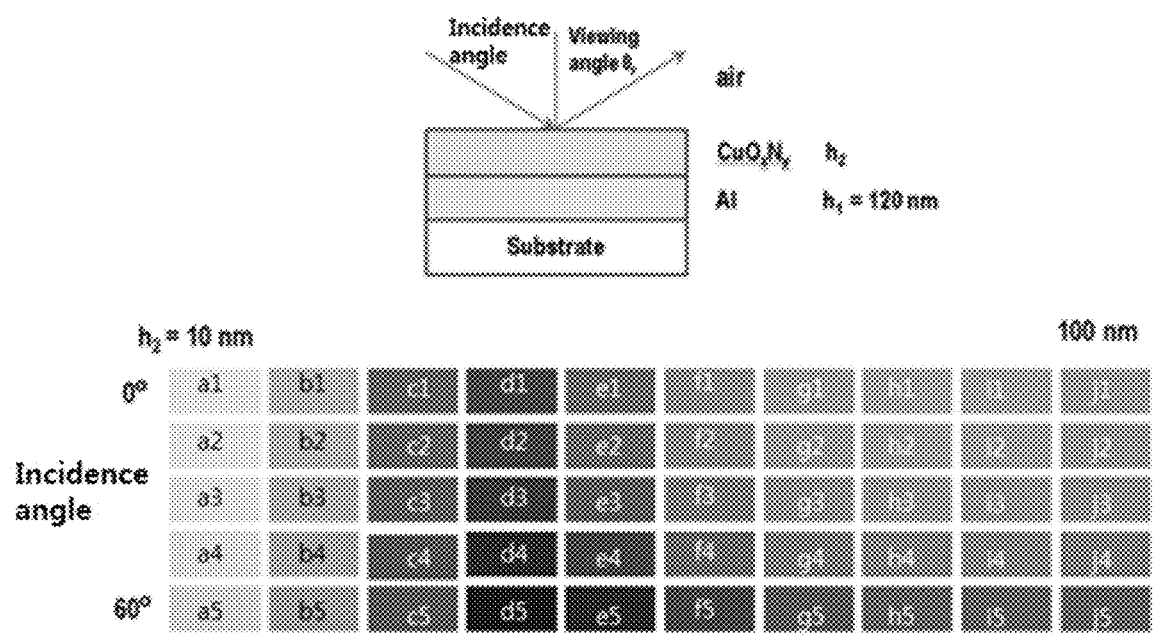

[FIG. 25]
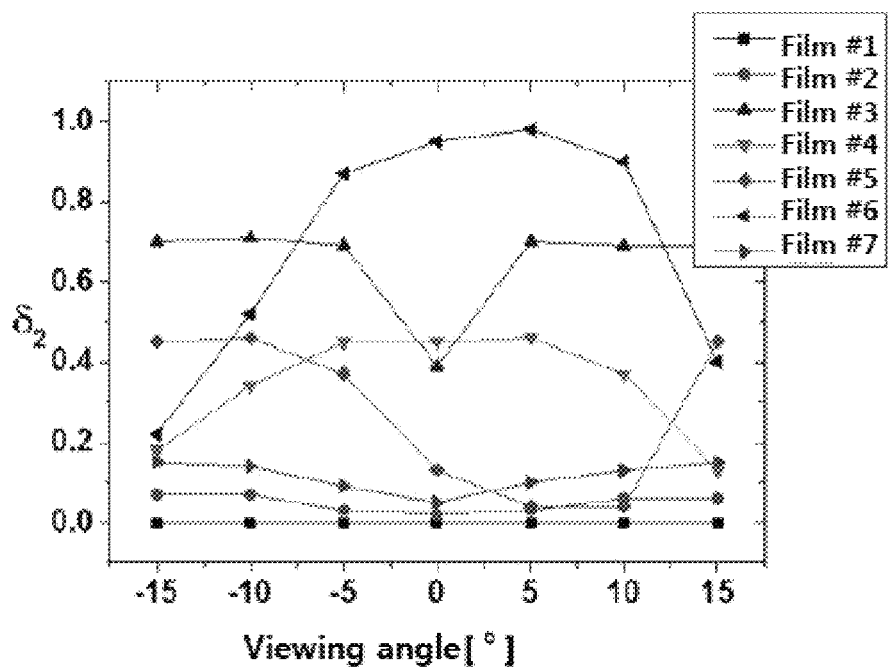

[FIG. 26]
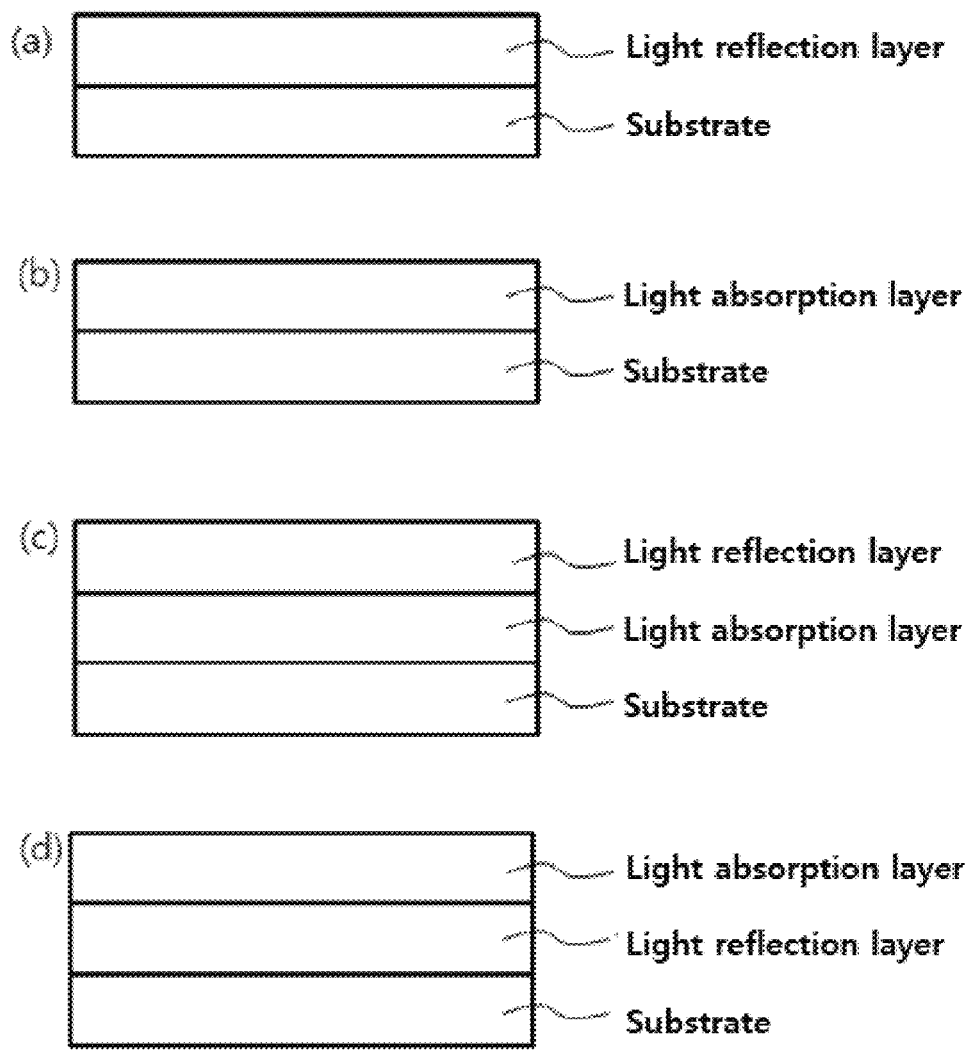

【FIG. 27】
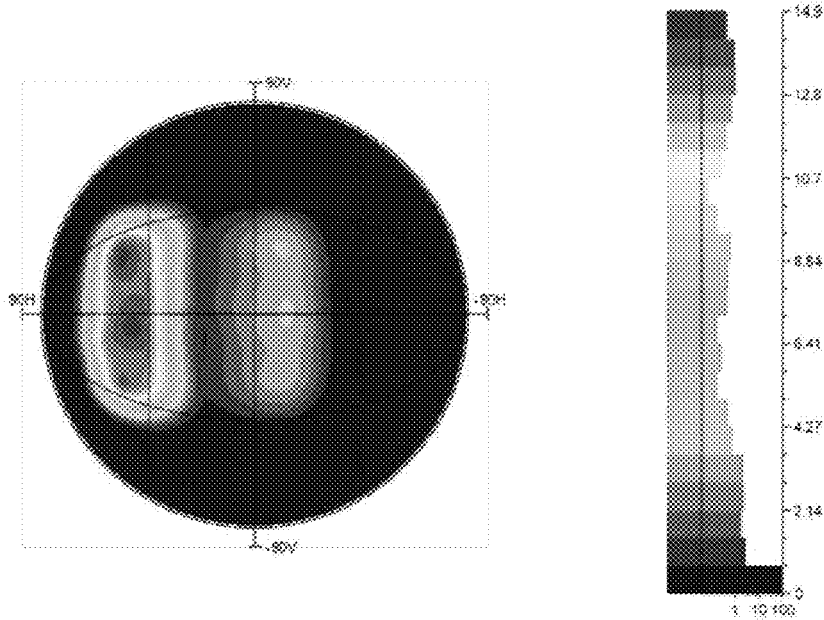
【FIG. 28】
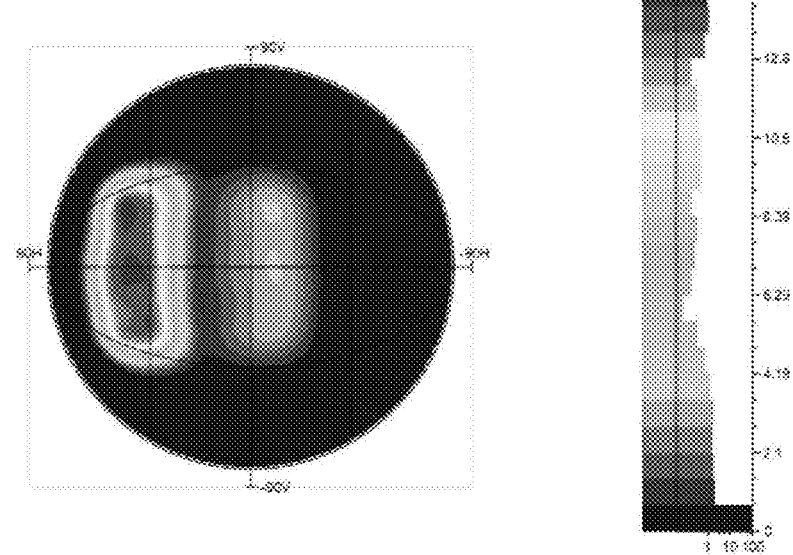

[FIG. 29]
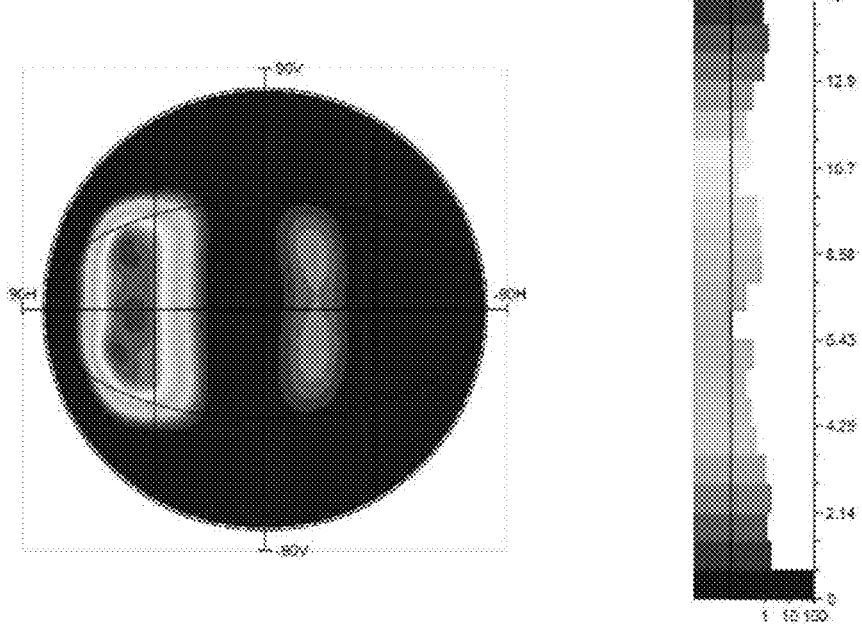
[FIG. 30]
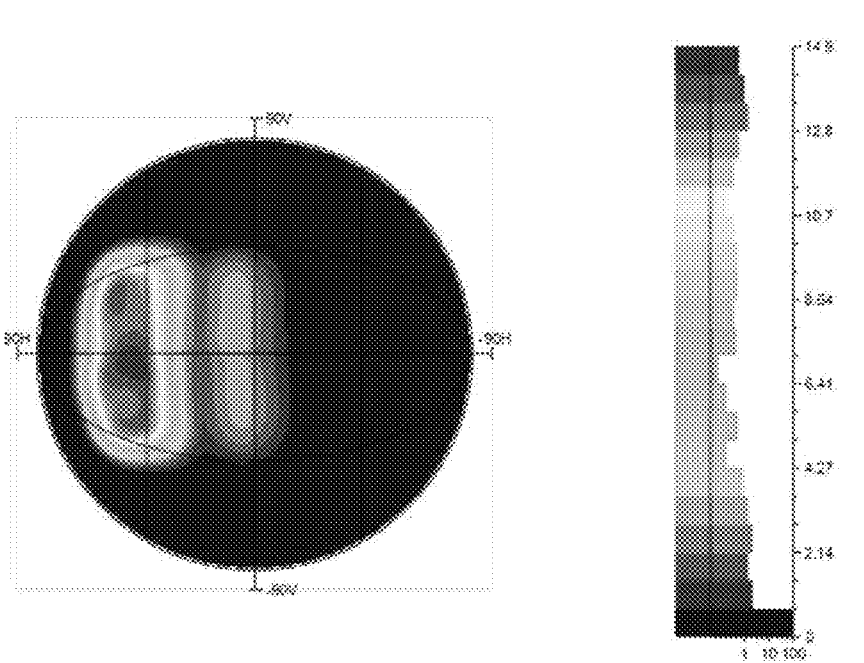

[FIG. 31]
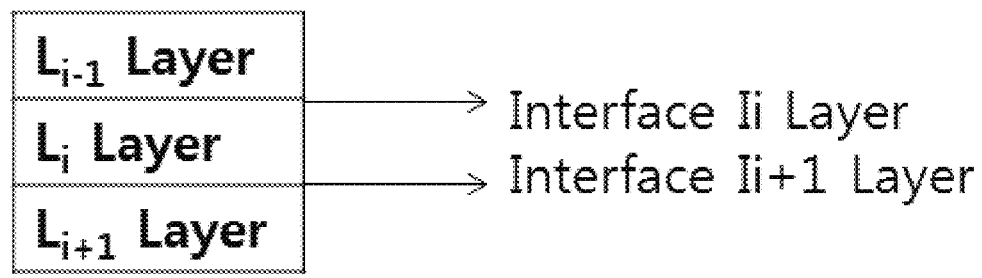
[FIG. 32]
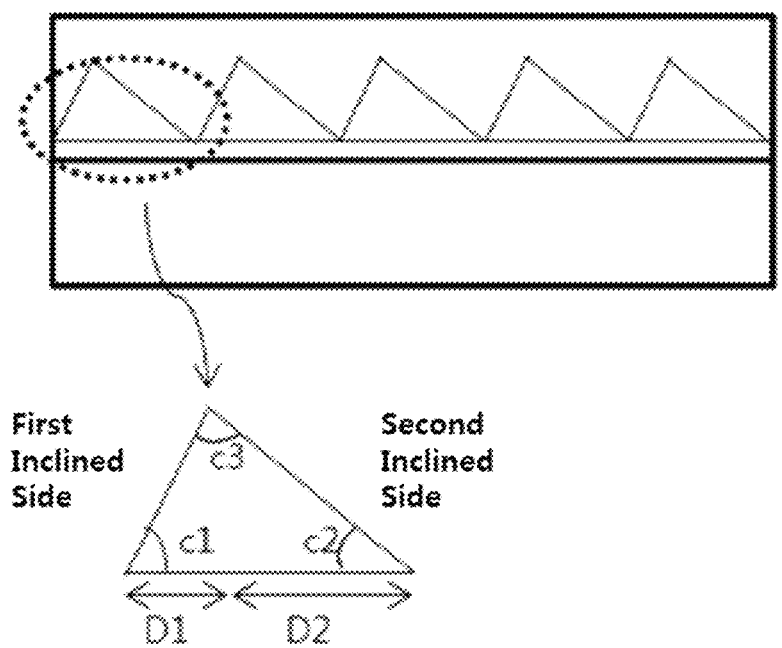

[FIG. 33]
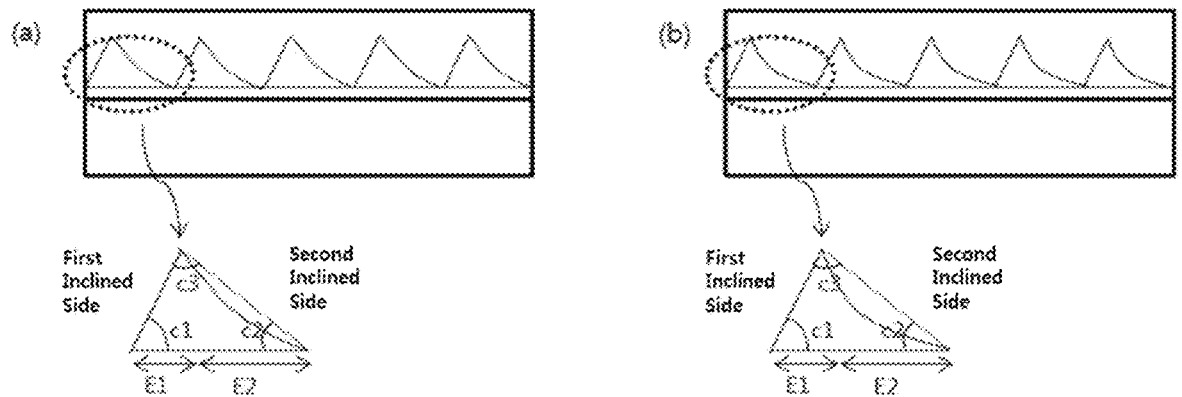
[FIG. 34]
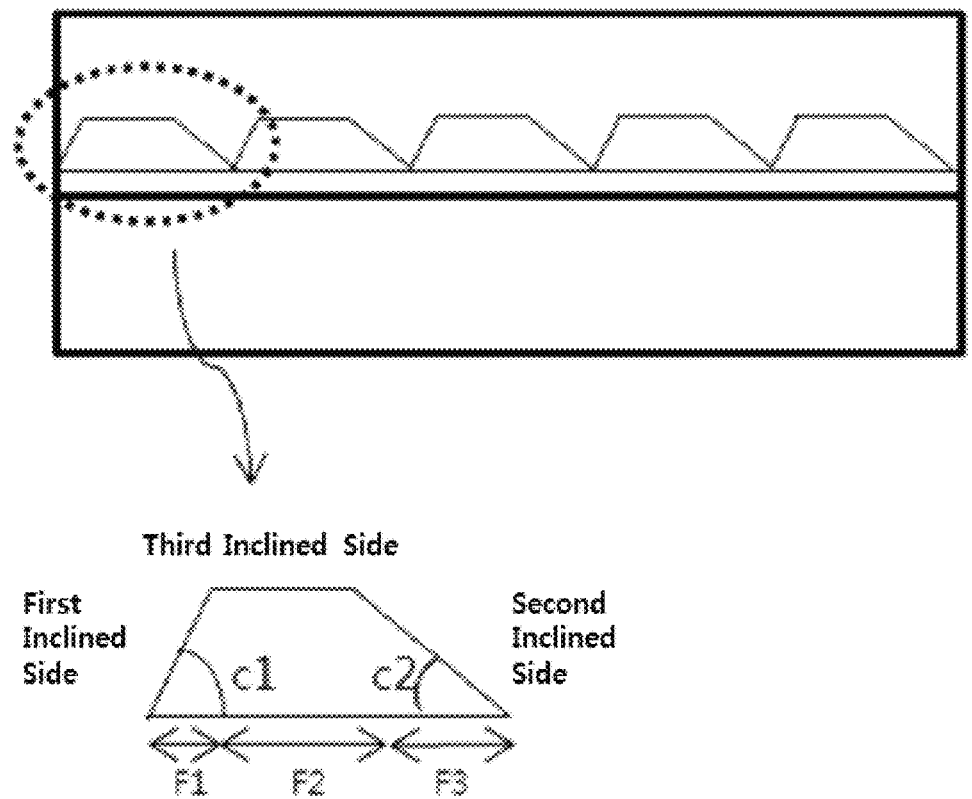

[FIG. 35]
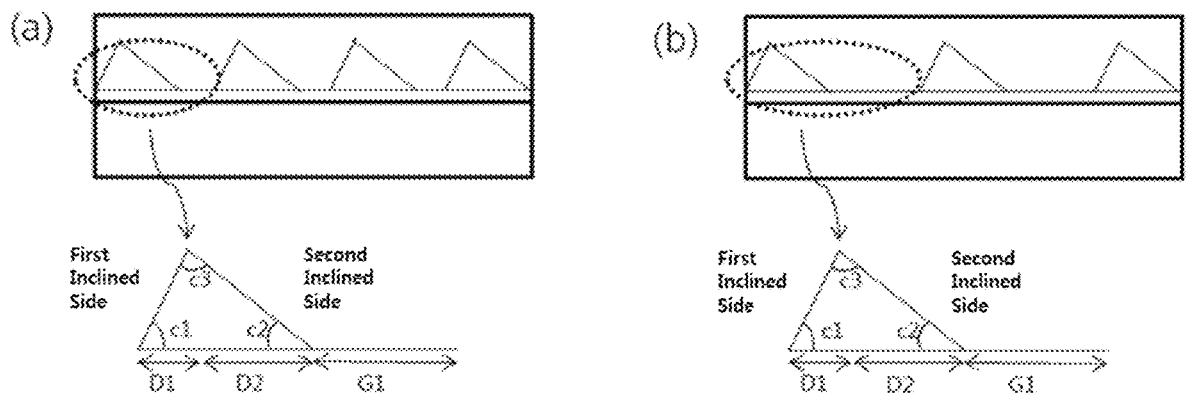
[FIG. 36]
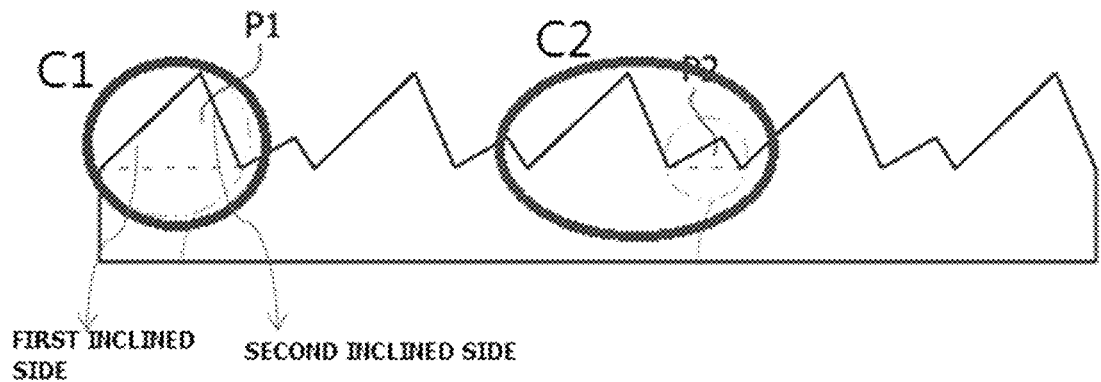
[FIG. 37]
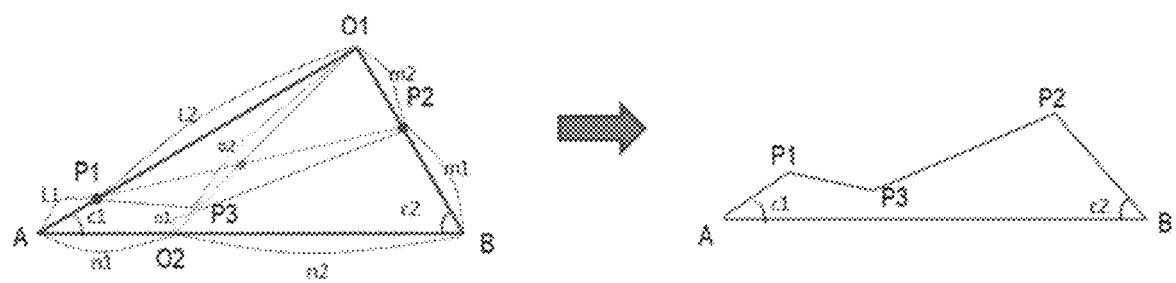

[FIG. 38]
[FIG. 39]
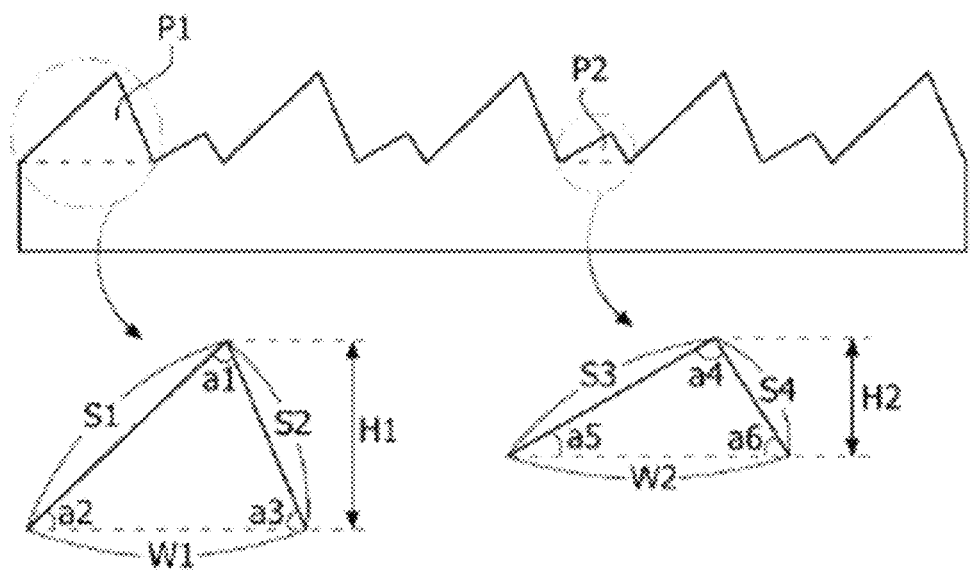

[FIG. 40]
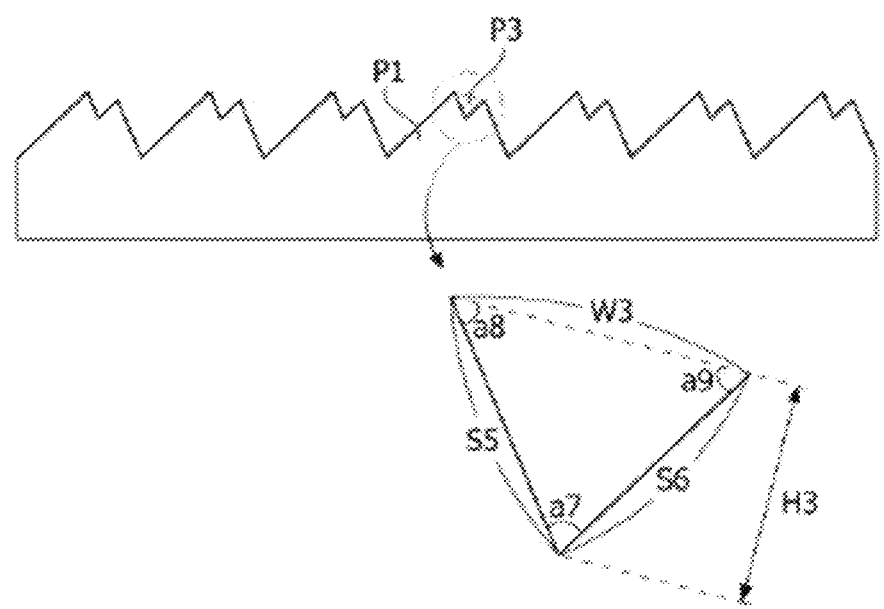

[FIG. 41]
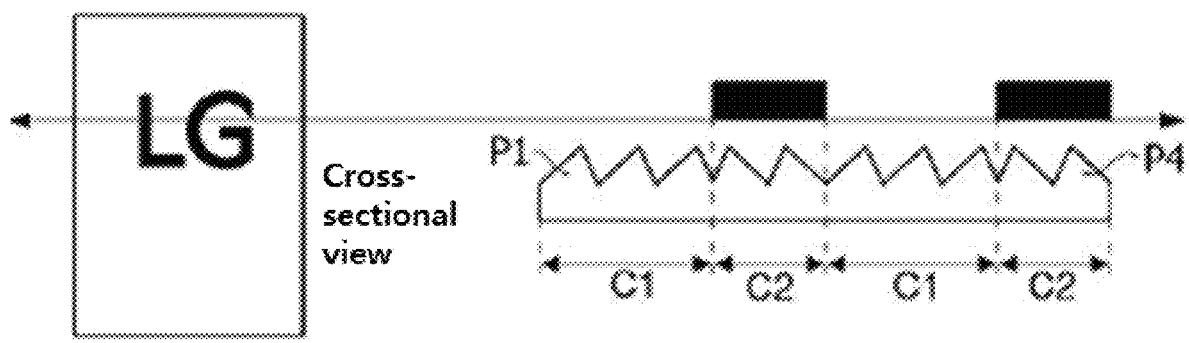
(a)
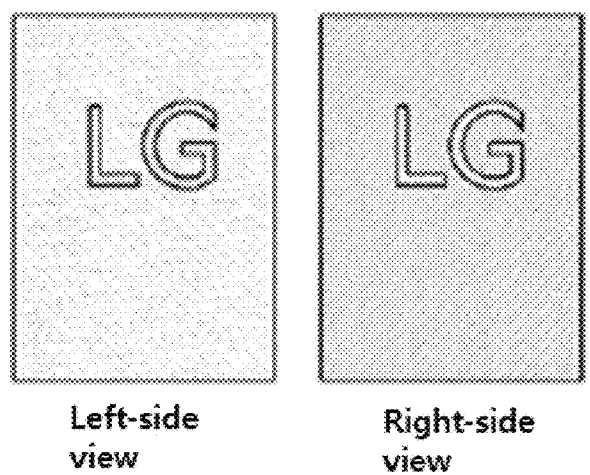
(b)

[FIG. 42]
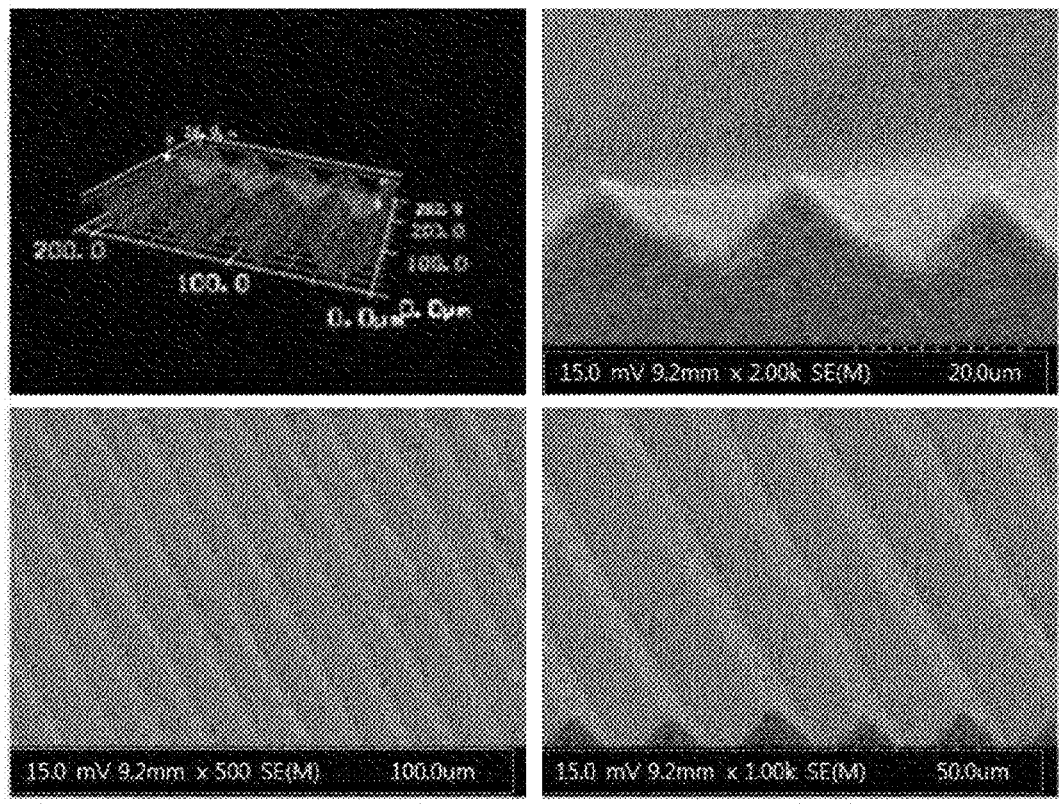
[FIG. 43]
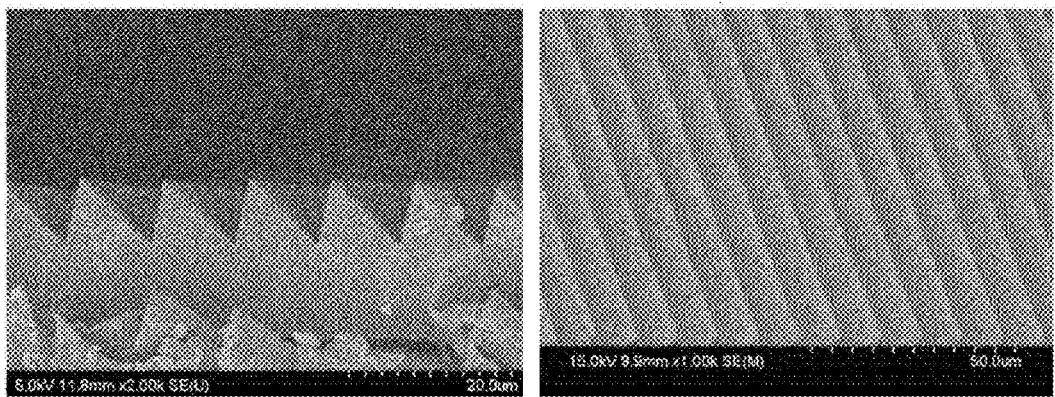

[FIG. 44]
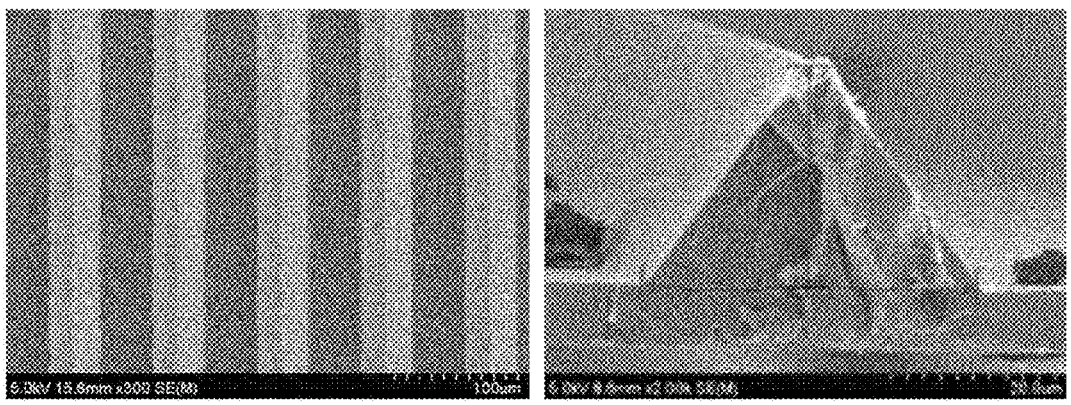
[FIG. 45]
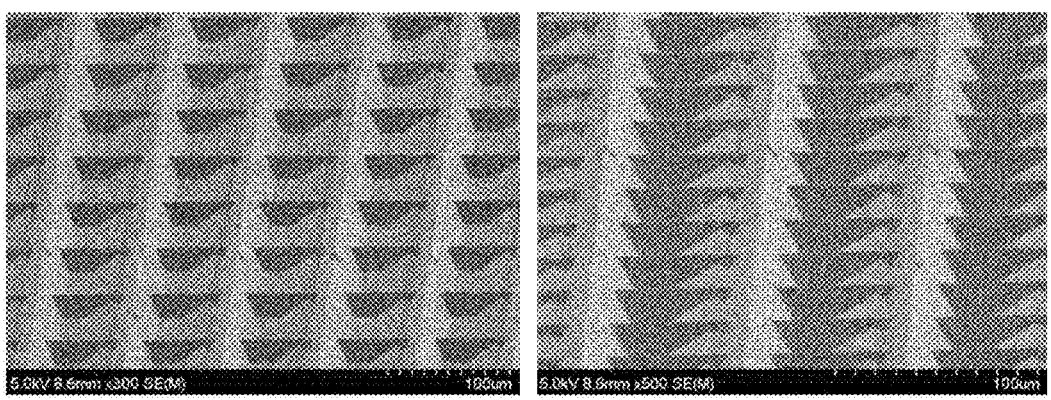

DECORATION MEMBER AND MANUFACTURING METHOD THEREFOR

The present application is a National Phase entry pursuant to 35 U.S.C. § 371 of International Application No. PCT/KR2019/000273 filed on Jan. 8, 2019, and claims priority to and the benefit of Korean Patent Application No. 10-2018-0002278, filed with the Korean Intellectual Property Office on Jan. 8, 2018, the entire contents of which are incorporated herein by reference.

FIELD

The present specification relates to a decorative member and a method for manufacturing the same. More particularly, the present specification relates to a decorative member suitable for mobile equipment and electronic devices, and a method for manufacturing the same.

BACKGROUND

Regarding cellular phones, various mobile devices and home appliances, designs such as color, shape and pattern of products, other than the functions of products, play a key role in giving a product value to customers. The designs of products affect the preference and price thereof as well.

For example, in the case of mobile phones, various colors and color senses are implemented on products by a variety of methods. Such a method includes applying color to a case material for mobile phones and attaching a decorative film (deco-film) provided with a desired color and shape to the case material to offer a design.

In conventional decorative films, color representation was attempted by a method such as printing or deposition. Characters or images were expressed in colors different from the background color by printing or deposition. However, when different colors are expressed on a single plane, printing should be conducted at least two times, and when various colors are applied to a three-dimensional pattern, implementation is practically difficult. In addition, conventional decorative films have a fixed color, even at different viewing angles. Although there is a slight change, it is limited only to difference in color sense.

SUMMARY

The present specification is directed to providing a decorative member which can provide surface characteristics with a sense of depth, unlike physical surface structures of decorative members, because the actual distance from the decorative member to the eyes of an observer is different from the distance that the observer visually senses.

One embodiment of the present specification provides a decorative member including a substrate and a decorative layer provided on the substrate, wherein, when a direction perpendicular to a plane of the decorative layer is defined as an x-axis, a direction on a surface of the decorative layer is defined as a y-axis, and a central point of a width of the y-axis on the decorative layer is detected using a detector under a condition of standard illuminant D65 in a wavelength range of 380 nm≤λ≤780 nm, an angle formed by a line connecting the center of the detector to a central point of a width of the y-axis on the decorative layer with the x-axis on the x-y axis plane is defined as a central viewing angle φv, a distance from the center of the detector to the central point of the width in the y-axis direction on the decorative layer is defined as Dv, and a depth parameter value $\delta_{1m}$ represented by the following Formula 1 in at least a part of the central viewing angle φv from −15° to +15° is 0.15 or more:

$$\delta_{1m} = |\Delta h|max/D_v \quad \text{[Formula 1]}$$

wherein |Δh|max is the maximum value of Δh represented by the following Formula 2:

$$\Delta h = \int_{\varphi e,min}^{\varphi e} \Delta d \, d\varphi \quad \text{[Formula 2]}$$

wherein Δd is represented by the following Formula 3:

$$\Delta d = r(\varphi_e + 0.15°) - r(\varphi_e - 0.15°) \quad \text{[Formula 3]}$$

wherein $\varphi_e$ is defined as a viewing angle formed by a line connecting the center of the detector to any point on the y axis on the decorative layer detected by the detector with the x-axis on the x-y axis plane; and $r(\varphi_e + 0.15°)$ and $r(\varphi_e - 0.15°)$ are represented by the following Formula 4 and the following Formula 5, respectively:

$$r(\varphi_e + 0.15°) = Dv \times \sqrt{f(\varphi e + 0.15°)/f(\varphi e)} \quad \text{[Formula 4]}$$

$$r(\varphi_e - 0.15°) = Dv \times \sqrt{f(\varphi e - 0.15°)/f(\varphi e)} \quad \text{[Formula 5]}$$

wherein f(φe), f(φe+0.15°) and f($\varphi_e$−0.15°) are angular luminances at viewing angles ($\varphi_e$), ($\varphi_e$+0.15°) and ($\varphi_e$−0.15°), respectively, wherein $\varphi_e$ satisfies the range of the following Formula 6:

$$-\tan^{-1}(100 \text{ mm}/2Dv) + 0.15° + \varphi_v = \varphi_e, min \leq \varphi_e \leq \varphi_e, max = \tan^{-1}(100 \text{ mm}/2Dv) - 0.15° + \varphi_v \quad \text{[Formula 6]}$$

wherein $\varphi_e$,min and $\varphi_e$,max are the minimum and the maximum of respectively.

Another embodiment of the present specification provides the decorative member according to the aforementioned embodiment, wherein a depth parameter value $\delta_{1b}$, represented by the following Formula 11 in at least a part of the central viewing angle $\varphi_v$ from −15° to +15° is 3 or more:

$$\delta_{1b} = |\Delta h'|max/Dv \quad \text{[Formula 11]}$$

wherein |Δh'|max is the maximum of Δh' represented by the following Formula 12:

$$\Delta h' = \int_{\varphi e,min}^{\varphi e} \Delta d' \, d\varphi \quad \text{[Formula 12]}$$

wherein Δd' is represented by the following Formula 13:

$$\Delta d' = r(\varphi e + \tan^{-1}(50 \text{ mm}/2Dv)) - r(\varphi_e - \tan^{-1}(50 \text{ mm}/2Dv)) \quad \text{[Formula 13]}$$

wherein $r(\varphi e + \tan^{-1}(50 \text{ mm}/2Dv))$ and $r(\varphi e - \tan^{-1}(50 \text{ mm}/2Dv))$ are distances recognized due to the difference in angular luminance to one point on the decorative layer recognized at viewing angles ($\varphi e + \tan^{-1}(50 \text{ mm}/2Dv)$) and ($\varphi e - \tan^{-1}$ (50 mm/2Dv)) by the detector and are represented by the following Formula 14 and Formula 15, respectively:

$$r(\varphi_e + \tan^{-1}(50 \text{ mm}/2Dv)) = Dv \times \sqrt{f(\varphi e + \tan^{-1}(50 \text{mm}/2Dv))/f(\varphi e)} \quad \text{[Formula 14]}$$

$$r(\varphi_e - \tan^{-1}(50 \text{ mm}/2Dv)) = Dv \times \sqrt{f(\varphi e + \tan^{-1}(50 \text{mm}/2Dv))/f(\varphi e)} \quad \text{[Formula 15]}$$

wherein f(φe), f(φe+tan$^{-1}$(50 mm/2Dv)) and f(φe−tan$^{-1}$ (50 mm/2Dv)) are angular luminances at viewing angles (φe), (φ$_e$+tan$^{-1}$(50 mm/2Dv)) and (φ$_e$−tan$^{-1}$(50 mm/2Dv)), respectively.

Another embodiment of the present specification provides the decorative member according to the aforementioned embodiments, wherein a depth parameter value Ω$_2$ represented by the following Formula 21 in at least a part of the central viewing angle φ$_v$ from −15° to +15° is 0.3 or more.

$$\Omega_2 = |\Delta d'|\max / D_v \qquad \text{[Formula 21]}$$

wherein |Δd'|max is the maximum value of Δd' represented by Formula 13 above.

Another embodiment of the present specification provides the decorative member according to the aforementioned embodiments, wherein the decorative member has one or more points where an absolute value of a value obtained by dividing a slope of an angular luminance graph according to the central viewing angle φv from −15° to +15° by angular luminance is 0.025 or more, wherein the angle unit is a degree (°).

Another embodiment of the present specification provides a decorative member including a substrate and a decorative layer provided on the substrate, wherein, when a direction perpendicular to a plane of the decorative layer is defined as an x-axis, a direction on a surface of the decorative layer is defined as a y-axis, and a central point of a width of the y-axis on the decorative layer is detected using a detector under a condition of standard illuminant D65 in a wavelength range of 380 nm≤λ≤780 nm, an angle formed by a line connecting the center of the detector to a central point of the width of the y-axis on the decorative layer with the x-axis on the x-y axis plane is defined as a central viewing angle φv, a distance from the center of the detector to the central point of the width in the y-axis direction on the decorative layer is defined as Dv, and a depth parameter value δ$_2$ represented by the following Formula 21 in at least a part of the central viewing angle φv from −15° to +15° is 0.3 or more:

$$\delta_2 = |\Delta d'|\max / D_v \qquad \text{[Formula 21]}$$

wherein |Δd'|max is the maximum value of Δd' represented by Formula 13 above:

Another embodiment of the present specification provides a decorative member including a substrate and a decorative layer provided on the substrate, wherein, when a direction perpendicular to a plane of the decorative layer is defined as an x-axis, a direction on a surface of the decorative layer is defined as a y-axis, and a central point of a width of the y-axis on the decorative layer is detected using a detector under a condition of standard illuminant D65 in a wavelength range of 380 nm≤λ≤780 nm, an angle formed by a line connecting the center of the detector to the central point of the width of the y-axis on the decorative layer with the x-axis on the x-y axis plane is defined as a central viewing angle φv, and the decorative member has one or more points where an absolute value of a value obtained by dividing a slope of an angular luminance graph according to the central viewing angle φv from −15° to +15° by angular luminance is 0.025 or more, wherein the angle unit is a degree (°).

Another embodiment of the present specification provides the decorative member according to the aforementioned embodiments, wherein the decorative layer includes: a light reflection layer provided on the substrate; a light absorption layer provided on the substrate; a light reflection layer provided on the substrate and a light absorption layer provided on the light reflection layer; or a light absorption layer provided on the substrate and a light reflection layer provided on the light absorption layer.

Another embodiment of the present specification provides the decorative member according to the aforementioned embodiments, wherein the decorative member is a decorative film, a case of a mobile device, or an electronic product.

The embodiments of the present specification provide a decorative member which can provide surface characteristics with a sense of depth, unlike physical surface structures of decorative members, because the actual distance from the decorative member to the eyes of an observer is different from the distance that the observer visually senses.

Particularly, by forming a decorative layer of a decorative member with a structure including one or more light reflection layers and/or one or more light absorption layers, light reflection and/or light absorption occurs on an incidence path when external light is incident on a reflection path when light is reflected, and constructive interference and destructive interference occur between reflected light generated on respective surfaces. A specific color can be expressed through light absorption and constructive interference and destructive interference on the incidence path and the absorption path. In addition, since the expressed color depends on thickness, the color can be changed according to thickness even when the same material composition is used. Therefore, when the light reflection layer and/or the light absorption layer have two or more points or regions having different thicknesses on the same surface, a plurality of colors can be expressed on a three-dimensional pattern by forming a color development layer on the three-dimensional pattern.

BRIEF DESCRIPTION OF THE DRAWINGS

FIG. 1 illustrates an example of a laminate structure of a decorative member according to one embodiment of the present specification;

FIG. 2 illustrates positions of a y-axis and central points of the width of the y-axis on a decorative layer of the decorative member according to embodiments of the present specification;

FIG. 3 is a schematic diagram showing calculation of the depth parameter value δ$_{1m}$ of the decorative member according to one embodiment of the present specification;

FIG. 4 is a graph showing the distribution of angular luminance depending on viewing angle of the decorative member according to one embodiment of the present specification;

FIG. 5 is a schematic diagram showing calculation of |Δh|max when calculating the depth parameter value of the decorative member according to one embodiment of the present specification;

FIG. 6 is a graph showing |Δd'|max and |Δd| when calculating the depth parameter value of the decorative member according to one embodiment of the present specification;

FIG. 7 is a graph showing |Δh| and |Δh|max when calculating the depth parameter value of the decorative member according to another embodiment of the present specification;

FIG. 8 shows the depth parameter value δ$_{1m}$ depending on viewing angle according to the type of film;

FIG. 9A shows an angular luminance distribution depending on viewing angle according to the type of film, and FIG. 9B shows a ratio of angular luminance distribution slope to angular luminance depending on viewing angle;

FIG. 10 is a schematic diagram showing calculation of the depth parameter value $\delta_{1b}$ of a decorative member by two eyes according to one embodiment of the present specification;

FIG. 11 shows the depth parameter value $\delta_{1b}$ depending on viewing angle according to the type of the film.

FIG. 12 is a schematic diagram showing calculation of |Δd'|max when calculating the depth parameter value $\delta_2$ of the decorative member by two eyes according to one embodiment of the present specification;

FIG. 13 is a schematic diagram for illustrating the principle of color development in a light reflection layer and a light absorption layer structure;

FIG. 14 illustrates a laminated structure of the decorative member according to an embodiment of the present specification;

FIG. 15 illustrates a laminated structure of the decorative member according to another embodiment of the present specification;

FIG. 16 illustrates a laminated structure of the decorative member according to a further embodiment of the present specification;

FIG. 17 illustrates a laminated structure of the decorative member according to still another embodiment of the present specification;

FIG. 18 illustrates upper surface structures of the light absorbing layer of the decorative member according to embodiments of the present specification;

FIG. 19 illustrates upper surface structures of the light absorbing layer of the decorative member according to other embodiments of the present specification;

FIG. 20 illustrates upper surface structures of the light absorbing layer of the decorative member according to further embodiments of the present specification;

FIGS. 21a-21i illustrate patterns that can be formed on the upper surface of the light absorbing layer;

FIG. 22 is a graph showing that color representation is changed depending on thickness of the light absorption layer;

FIG. 23 is a graph of a reflectance simulation graph of CuO/Cu depending on CuO deposition thickness;

FIG. 24 is a simulation result showing that a different color is observed depending on viewing angle;

FIG. 25 shows the depth parameter value $\delta_2$ depending on viewing angle according to the type of film;

FIGS. 26a-26d are illustrations of laminated structures of the decorative member according to some embodiments of the present specification;

FIG. 27 shows angular luminance at the center of the decorative member of an asymmetric prismatic film used in Example 5;

FIG. 28 shows angular luminance at a point 2.5 mm away from the center of the decorative member of an asymmetric prismatic film used in Example 5;

FIG. 29 shows angular luminance at the center of the decorative member of an asymmetric prismatic film used in Example 6;

FIG. 30 shows angular luminance at a point 2.5 mm away from the center of the decorative member of an asymmetric prismatic film used in Example 6;

FIG. 31 shows a structure including a light absorption layer and a light reflection layer;

FIG. 32 shows a pattern structure according to one embodiment;

FIGS. 33a and 33b show pattern structures according to additional embodiments;

FIG. 34 shows a pattern structure according to a further embodiment;

FIGS. 35a and 35b illustrate pattern structures formed according to other embodiments;

FIG. 36 illustrates a pattern structure formed according to still another embodiment;

FIG. 37 illustrates pattern structures formed according to additional embodiments;

FIGS. 38a and 38b illustrate pattern structures formed according to further embodiments;

FIG. 39 illustrates a pattern structure formed according to another embodiment;

FIG. 40 illustrates a pattern structure formed according to still another embodiment;

FIGS. 41a and 41b illustrate pattern structures formed according to additional embodiments;

FIG. 42 is images of a pattern structure formed according to a further embodiment;

FIG. 43 is images of a pattern structure formed according to another embodiment;

FIG. 44 is images of a pattern structure formed according to still another embodiment; and FIG. 45 is images of a pattern structure formed according to an additional embodiment.

DETAILED DESCRIPTION

Hereinafter, the present specification will be described in more detail.

As used herein, the term "point" or "spot" means a position that does not have an area. In the present specification, the aforementioned expression is used to indicate a specific position observed by an observer or to indicate that there are two or more points of a light reflection layer or a light absorption layer that differ in thickness from each other. As used herein, the term "region" represents a portion that has a certain area. For example, when the decorative member is placed on the surface of the ground and a closed section is defined on the upper surface of the decorative member in a direction perpendicular to the ground surface, the "region" of the decorative member means an area of the upper surface of the decorative member of the defined closed section.

As used herein, the term "plane" or "region" may be a flat plane, but is not limited thereto and all or a part thereof may be a curved plane. For example, the shape of perpendicular cross-sectional surface may include a part of an arc of a circle or an ellipse, a wave structure, a zigzag structure or the like.

As used herein, the term "inclined plane" means a plane that has an angle formed by an upper surface of a decorative member and the ground of higher than 0 degrees and not higher than 90 degrees, when the decorative member is placed on the ground.

As used herein, the term "thickness" of any layer means the shortest distance from a lower surface to an upper surface of the layer.

As used herein, the term "or" means selectively or entirely including listed elements, that is, "and/or", unless stated otherwise.

As used herein, the term "layer" means that at least 70%, preferably at least 75%, more preferably at least 80%, of the area where the corresponding layer is present is covered.

One embodiment of the present specification provides a decorative member including a substrate and a decorative layer provided on the substrate, wherein, when a direction perpendicular to a plane of the decorative layer is defined as an x-axis, a direction on a surface of the decorative layer is defined as a y-axis, and a central point of a width of the y-axis on the decorative layer is detected using a detector under the condition of standard illuminant D65 in a wavelength range of 380 nm≤λ≤780 nm, an angle formed by a line connecting the center of the detector to the central point of the width of the y-axis on the decorative layer with the x-axis on the x-y axis plane is defined as a central viewing angle φv, a distance from the center of the detector to the central point of the width in the y-axis direction on the decorative layer is defined as Dv, and a depth parameter value $\delta_{1m}$ represented by the following Formula 1 in at least a part of the central viewing angle φv from −15° to +15° is 0.15 or more:

$$\delta_{1m} = |\Delta h|max/D_v \quad \text{[Formula 1]}$$

wherein |Δh|max is the maximum value of Δh represented by the following Formula 2:

$$\Delta h = \int_{\varphi e,min}^{\varphi e} \Delta d d\varphi \quad \text{[Formula 2]}$$

wherein Δd is represented by the following Formula 3:

$$\Delta d = r(\varphi_e + 0.15°) - r(\varphi_e - 0.15°) \quad \text{[Formula 3]}$$

wherein $\varphi_e$ is defined as a viewing angle formed by a line connecting the center of the detector to any point on the y axis on the decorative layer detected by the detector with the x-axis on the x-y axis plane, and $r(\varphi_e+0.15°)$ and $r(\varphi_e-0.15°)$ are represented by the following Formula 4 and the following Formula 5, respectively:

$$r(\varphi_e + 0.15°) = Dv \times \sqrt{f(\varphi e + 0.15°)/f(\varphi e)} \quad \text{[Formula 4]}$$

$$r(\varphi_e - 0.15°) = Dv \times \sqrt{f(\varphi e - 0.15°)/f(\varphi e)} \quad \text{[Formula 5]}$$

wherein $f(\varphi_e)$, $f(\varphi_e+0.15°)$ and $f(\varphi_e-0.15°)$ are angular luminances at viewing angles $(\varphi_e)$, $(\varphi_e+0.15°)$ and $(\varphi_e-0.15°)$, respectively, wherein $\varphi_e$ satisfies the range of the following Formula 6:

$$-\tan^{-1}(100 \text{ mm}/2Dv) + 0.15° + \varphi_v = \varphi_e, min \leq \varphi_e \leq \varphi_e, max = \tan^{-1}(100 \text{ mm}/2Dv) - 0.15° + \varphi_v \quad \text{[Formula 6]}$$

wherein $\varphi_e$,min and $\varphi_e$,max are the minimum and the maximum of $\varphi_e$, respectively.

In this specification, since, based on the center point of the width of the y axis in the direction in which the detector faces the decorative layer, the right side is defined as "+" and the left side is defined as "−", the axis "+y" means the y axis at the right side of the center point. Although it is not important which side is defined as "+" or "−", the right side of the central point is defined as a "+y" axis in this specification to avoid confusion. That is, the x−y-axis plane is composed of an x−(+y) axis plane and an x−(−y) axis plane.

In this specification, when φv is a positive value, a line connecting the center of the detector to the center point of the width of the y-axis on the decorative layer exists in the x−(+y) axis plane. On the other hand, when φv is a negative value, a line connecting the center of the detector and the center point of the width of the y-axis on the decorative layer exists in the x−(−y) axis plane.

FIG. 1 and FIG. 2 show a side surface structure and an upper surface structure of a decorative member according to an embodiment of the present specification, respectively. FIG. 1 illustrates a side surface structure in which a substrate and a decorative layer are laminated, wherein a direction perpendicular to the decorative layer is represented by an x-axis. FIG. 2 illustrates the side of the decorative layer of the decorative member, wherein any one direction in the plane of the decorative layer is represented by a y-axis. The y-axis is not limited to the direction illustrated in FIG. 2 and can be selected from various directions.

In one embodiment, the y-axis may be horizontal or perpendicular to the longest side of the edges of the decorative layer.

In another embodiment, the y-axis may be perpendicular to the longest side of the edges of the decorative layer and, for example, the y-axis is the y-axis of the first diagram of FIG. 2.

The central point of the width of the y-axis means a point at the same distance from both ends of the y-axis, as represented by dots or broken lines in FIG. 2.

Any detector may be used without particular limitation as long as it is capable of visually recognizing the shape and color of the decorative member, and may be a human eye or a device that can perform the same function as the human eye.

FIG. 3 is a schematic view for measuring the depth parameter value $\delta_{1m}$ of the decorative member according to an embodiment of the present specification. In FIG. 3, a direction perpendicular to the plane of the decorative layer is defined as an x-axis direction, a direction of the width of any one direction on the plane of the decorative layer is defined as a y-axis direction, and a width direction perpendicular to the y-axis on the plane of the decorative layer is defined as a z-axis (that is, z-axis is perpendicular to both the x-axis and the y-axis). Here, the width of the decorative layer in the y-axis direction is defined as "$d_f$" (e.g., FIG. 5). The width of the decorative layer in the y-axis direction means the distance between both ends of the y-axis. In one embodiment, $d_f$ may be the shortest width of the decorative layer. For example, when the decorative layer has a rectangular shape, the width of the short side of the rectangle may be referred to as "$d_f$". Hereinafter, the angle formed by a line connecting the center of the detector to any point on the decorative layer detected by the detector and the +z-axis is referred to as "θ" and the angle formed by the line and the x-axis on the x-y axis plane is referred to as "φ".

As shown in FIG. 3, when the angular luminance of light with a wavelength of λ in the (θ, φ) direction emitted from the point of the coordinates (0, y, z) of the surface of the decorative layer of the decorative member is defined as f(Dv, y, z; θ, φ, λ)", the center of the detector is at the position of (Dv+Dv sin θe sin φe, y-Dv sin θe cos φe, z+Dv cos θe) and the angular luminance in the direction of the line connecting this point to (0, y, z) is defined as f(Dv, y, z; θe, φe, λ). At this time, the viewing angle is defined as (−θe, −φe).

In the aforementioned embodiment, the depth parameter value $\delta_{1m}$ depending on angle φ is defined at a constant central viewing angle $\theta_v$, for example, $\theta_v$=90° in the z-axis direction.

In the aforementioned embodiment, the depth parameter value $\delta_{1m}$ represented by Formula 1 above is 0.15 or more in at least part of the central viewing angle φv of −15 degrees to +15 degrees. Thus, when such requirement of the depth parameter value $\delta_{1m}$ is satisfied, surface characteristics with a sense of depth can be implemented regardless of the presence or type of the physical surface structure of the decorative member.

In Formula 2 above, Δd is defined as the difference between the distance recognized by the detector due to the difference in angular luminance in angle φ direction at the minimum viewing angle ($\varphi_e-\varphi_R/2$) and the distance recognized by the detector due to the difference in angular luminance in angle $\varphi$ direction at the maximum viewing angle ($\varphi_e+\varphi_R/2$) according to the resolution of the eye in the region of the decorative layer having a viewing angle $\varphi_e$ and is represented by the following Formula A:

$$\Delta d = r(\varphi e + \varphi_R/2) - r(\varphi e - \varphi_R/2) \quad \text{[Formula A]}$$

wherein $\varphi_R$ is a resolution of the detector in angle $\varphi$ direction.

The resolution of the eye means the ability of the detector to distinguish two or more points. If the detector is a human eye, the resolution may slightly differ from person to person. However, there is no great variation in angular resolution within 1°, since the value of Formula 1 converges on a certain value, as angular resolution decreases. Accordingly, in the following Formula 3, angular resolution ($\varphi_R$) is set to 0.3°.

In Formula 3, $r(\varphi e+0.15°)$ and $r(\varphi e-0.15°)$ are the distances recognized due to the difference in angular luminance to any one point on the decorative layer to a point on the decorative layer detected at viewing angles of ($\varphi_e+0.15°$) and ($\varphi_e-0.15°$) by the detector, respectively.

In Formula 4 and Formula 5 above, $f(\varphi e+0.15°)$ and $f(\varphi e-0.15°)$ are angular luminances at viewing angles ($\varphi e+$) 0.15° and ($\varphi e-0.15°$), respectively. Each angular luminance can be calculated through reflection measurement or optical simulation at an interval of 5 nm or less in a wavelength range of 380 nm≤λ≤780 nm of the incident light of a D65 light source. The reflection measurement can be carried out using a Shimadzu SolidSpec-3700, Konica Minolta CM-2600d, CM-M6, etc., or using a halogen lamp, monochromator and goniometer. The optical simulation can be carried out at an interval of 5 nm or less in a wavelength range of 380 nm≤λ≤780 nm using reflected light by each angle reflected from the pattern when the incident light is a D65 standard light source. Also, the reflected light at each angle can be calculated at an interval of 5° or less in the angle range of 0°≤φ≤180°.

When the angular luminance in the ($\theta$, $\varphi$) direction of light having a wavelength $\lambda$ emitted from the surface of the decorative member having uniform angular luminance satisfying the aforementioned requirement is referred to as $f(\theta, \varphi, \lambda)$ and the viewing angle is set to ($-\theta e, -\varphi e$), r, which is defined as the distance to the point on the surface of the decorative layer of the decorative member positioned in the ($-\theta$, $-\varphi$) direction, based on the center of the detector, can be obtained by the following Formula B and Formula C:

$$r^2(\theta,\varphi)f(\theta,\varphi,\lambda)=Dv^2f(\theta e,\varphi e,\lambda) \quad \text{[Formula B]}$$

The following Formula C can be obtained from Formula B:

$$r(\theta,\varphi,\lambda)=Dv \times \sqrt{f(\theta e,\varphi e,\lambda)/f(\theta,\varphi,\lambda)} \quad \text{[Formula C]}$$

Formula 4 and Formula 5 above are obtained in the same manner as in Formulas B and C above.

Here, r is not the actual distance but the distance that can be sensed due to the difference of angular luminance.

The difference in height in the ($\theta$, $\varphi$) direction of the rectangle on the plane having the viewing angle ($-\theta e, -\varphi e$) as the center and four points ($-\theta e+\theta_R/2, -\varphi e$), ($-\theta e-\theta_R/2, -\varphi e$), ($-\theta e, -\varphi e+\varphi_R/2$), and ($-\theta e, -\varphi_e-\varphi_R/2$) as vertexes may be represented by the following Formulas. The following Formula D shows the difference in height in the angle $\theta$ direction and the following Formula E shows the difference in height in the angle $\varphi$ direction:

$$\Delta d(\theta e,\lambda)=r(\theta e+\theta R/2,\varphi,\lambda)-r(\theta e-\theta R/2,\varphi,\lambda) \quad \text{[Formula D]}$$

$$\Delta d(\theta e,\varphi e,\lambda)=r(\theta e,\varphi e+\varphi R/2,\lambda)-r(\theta e,\varphi e-\varphi R/2,\lambda) \quad \text{[Formula E]}$$

A surface slope in the e direction at one point of the decorative member at a viewing angle of $\theta e$ satisfies the following Formula F and a surface slope in the $\varphi$ direction at one point of the decorative member at a viewing angle of $\varphi e$ satisfies the following Formula G:

$$\Delta d/Dv \sin \theta e \Delta(\theta e)=\delta r/Dv \sin \theta e \delta(\theta e) \quad \text{[Formula F]}$$

$$\Delta d/Dv\Delta=\delta r/Dv\delta(\varphi e) \quad \text{[Formula G]}$$

Formula F represents a surface slope in the $\theta$ direction sensed by the difference in angular luminance, not the actual surface slope at one point on the surface of the decorative member, and Formula G represents a surface slope in the $\varphi$ direction sensed by the difference in angular luminance, not the actual surface slope at one point on the surface of the decorative member.

An example of the distribution of angular luminance depending on the viewing angle ($\varphi e$) in the $\varphi$ direction, when the central viewing angle ($\theta v$) in the $\theta$ direction, is 90° is shown in FIG. 4.

$\Delta d$, the height difference at each position of the surface of the decorative member, that is, in the region represented by a red rectangle in FIG. 3 can be calculated by Formula D and Formula E. When the width in the y direction of the decorative layer is $d_f$ and the central viewing angle connecting the center of the decorative member to the center of the detector such as the eye is fixed to $\varphi v$, the range of the viewing angle ($\varphi e$) in the $\varphi$ direction on the surface of the decorative layer of the decorative member may be represented by the following Formula H.

$$-\tan^{-1}(d_f/2Dv)+\varphi_{R/2}+\varphi_v=\varphi_{e,min}\leq\varphi_e\leq\varphi_{e,max}=\tan^{-1}(d_f/2Dv)-\varphi_{R/2}+\varphi_v \quad \text{[Formula H]}$$

Formula 6 given above shows the maximum value and the minimum value of the viewing angle $\varphi e$ obtained in consideration of the width $d_f$ in the y-axis direction and the distance Dv between the detector and the decorative layer, when angular resolution $\varphi_R$ of the detector is set to 0.3° (degrees). In this case, $d_f$ is defined as the width in the y-axis direction of the decorative layer. However, in the present specification, although the actual width of the decorative layer is not equal to $d_f$ and is larger than $d_f$, physical properties in the region having the width $d_f$ can be shown, and although the actual width of the decorative layer is slightly smaller than $d_f$, the aforementioned depth parameter properties can be shown. For example, when $d_f$ is 100 mm, in the case where the width of the decorative layer in the y-axis direction is larger than 100 mm, the depth parameter value described above can be satisfied in a region having a width of at least 100 mm and desired properties can be provided. 100 mm is determined in consideration of the normal viewing angle of the detector such as human eyes or the width of mobile devices.

At Dv=500 mm, $d_f$=100 mm, $\theta_v$=90°, $\varphi v$=0°, and $\varphi_R$=0.3°, $\Delta d$ and $\Delta h$ of the decorative member having the angular luminance distribution as shown in FIG. 4 may be represented by FIG. 6 and FIG. 7, respectively. FIG. 5 is a schematic diagram showing the meaning of $|\Delta h|_{max}$.

The condition that angular luminance of light emitted from the surface of the decorative layer of the decorative member of FIG. 3 is constant regardless of the surface position (y, z) value of the decorative layer can be presented as follows. When all the surfaces of the decorative layer are divided by a unit area having a size of 2.5 mm×2.5 mm and the angular luminances of light having a wavelength $\lambda$ emitted from the respective unit areas are the same, the decorative layer may have the following conditions. The following conditions may be applied in the aforementioned embodiments and in the following embodiments.

(1) The decorative layer has a pattern arranged in one dimension, and a pitch in the one-dimensional direction of the pattern is smaller than 1 mm.

(2) The decorative layer has a pattern arranged in two dimensions and each pitch in the two-dimensional direction of the pattern is smaller than 1 mm.

The one-dimensionally arranged pattern includes a pattern including a structure repeated in one direction (one dimension), such as a prism and lenticular pattern, and the two-dimensionally arranged pattern may include a pattern including a pattern arranged in two directions (two dimensions) such as a microlens array, but the present specification is not limited thereto.

Dv may be 500 mm. Dv is determined in consideration of the distance at which the detector such as the human eye distinguishably views an object.

In one embodiment, the height difference of the upper surface of the decorative layer is greater than 10 μm and is less than 2 mm.

In one embodiment, when the central viewing angle φv is in the range of −15° to +15°, the depth parameter value $\delta_{1m}$ represented by Formula 1 above is 0.15 or more.

In another embodiment of the present specification, provided is a decorative member wherein a depth parameter value $\delta_{1b}$ represented by the following Formula 11 is 3 or more in at least a part of the central viewing angle φv from −15° to +15°:

$$\delta_{1b}=|\Delta h'|max/Dv \quad \text{[Formula 11]}$$

wherein |Δh'|max is the maximum of Δh' represented by the following Formula 12:

$$\Delta h' = \int_{\varphi e,min}^{\varphi e} \Delta d' d\varphi \quad \text{[Formula 12]}$$

wherein Δd' is represented by the following Formula 13:

$$\Delta d'=r(\varphi e+\tan^{-1}(50\ mm/2Dv))-r(\varphi_e-\tan^{-1}(50\ mm/2Dv)) \quad \text{[Formula 13]}$$

wherein $r(\varphi e+\tan^{-1}(50\ mm/2Dv))$ and $r(\varphi e-\tan^{-1}(50\ mm/2Dv))$ are distances recognized due to the difference in angular luminance to one point on the decorative layer recognized at viewing angles $(\varphi e+\tan^{-1}(50\ mm/2Dv))$ and $(\varphi e-\tan^{-1}(50\ mm/2Dv))$ by the detector and are represented by the following Formula 14 and Formula 15, respectively:

$$r(\varphi_e+\tan^{-1}(50\ mm/2Dv))=Dv\times\sqrt{f(\varphi e+\tan^{-1}(50mm/2Dv))/f(\varphi e)} \quad \text{[Formula 14]}$$

$$r(\varphi_e-\tan^{-1}(50\ mm/2Dv))=Dv\times\sqrt{f(\varphi e+\tan^{-1}(50mm/2Dv))/f(\varphi e)} \quad \text{[Formula 15]}$$

wherein f(φe), f(φe+tan⁻¹(50 mm/2Dv)) and f(φe−tan⁻¹(50 mm/2Dv)) are angular luminances at viewing angles (φe), (φe+tan⁻¹(50 mm/2Dv)) and (φe−tan⁻¹(50 mm/2Dv)), respectively.

Δd' is the maximum height difference recognized at a certain central viewing angle φv on the decorative member.

The height difference in the angle θ direction is represented by the following Formula J and the height difference in the angle φ direction is represented by the following Formula K:

$$\Delta d(\theta e,\varphi e,\lambda)=rr(\theta e+\theta_d/2,\varphi e,\lambda)-rl(\theta e-\theta_d/2,\varphi e,\lambda) \quad \text{[Formula J]}$$

$$\Delta d(\theta e,\varphi e,\lambda)=rr(\theta e,\varphi e+\varphi_d/2,\lambda)-rl(\theta e,\varphi e-\varphi_d/2,\lambda) \quad \text{[Formula K]}$$

wherein $\theta_d$ and $\varphi_d$ are the differences in viewing angle in the angle θ direction and the angle φ direction of the left eye and the right eye, respectively, and $r_r(\theta e+\theta_d/2, \varphi e, \lambda)$ and $r_r(\theta e, \varphi e+\varphi_d/2, \lambda)$ are distances sensed by the right eye due to the difference in angular luminance in θ and φ directions, respectively, and $r_1(\theta e-\theta_d/2, \varphi e, \lambda)$ and $r_1(\theta e, \varphi_d/2, \lambda)$ are distances sensed by the left eye due to the difference in angular luminance in θ and φ directions, respectively.

The depth parameter value $\delta_{1b}$ according to Formula 11 is determined under the conditions of Dv=500 mm, $\theta_v$=90 degrees, and φv=0 degrees in consideration of characteristics when the detector is two human eyes. In this case, in consideration of the mean distance between human eyes, in Formula 13, $|\vec{d}_{eye}|$ is set to 50 mm.

A schematic diagram for obtaining the depth parameter value $\delta_{1b}$ by the two eyes is illustrated in FIG. 10.

When the detector is two human eyes, in the case where a viewing angle formed by a line connecting one point of the surface of the decorative member to the center of the two eyes with the z axis is defined as θe, a viewing angle formed by the line with the x-axis on the x-y axis plane is defined as "φe", θd is defined as the difference in viewing angle in the θ direction between the left and right eyes, and φd is defined as the difference in viewing angle in the φ direction between the left and right eyes, θd and φd are represented by the following Formula L and Formula M:

$$\theta_d = \left|2\ \tan^{-1}\left(\frac{\vec{d}_{eye}\cdot\hat{z}}{2D_v}\right)\right| \quad \text{[Formula L]}$$

$$\varphi_d = \left|2\ \tan^{-1}\left(\frac{\vec{d}_{eye}\times\hat{z}}{2D_v}\right)\right| \quad \text{[Formula M]}$$

wherein $\vec{d}_{eye}$ is a vector connecting the center of the left eye to the center of the right eye, and $\hat{Z}$ is a unit vector in the z-axis direction.

When the viewing angle of the center of the left eye and the right eye is referred to as (−θe, −φe), the viewing angle of the left eye is $$(-\theta_l, -\varphi_l) = \left(-\theta_e + \frac{\theta_d}{2}, -\varphi_e + \frac{\varphi_d}{2}\right),$$

and the viewing angle of the right eye is $$(-\theta_r, -\varphi_r) = \left(-\theta_e - \frac{\theta_d}{2}, -\varphi_e - \frac{\varphi_d}{2}\right).$$

$r_{l,r}$, which is defined as the distance to a point (0,y,z) on the film surface sensed by the left eye and the right eye, is represented by the following Formulae N and O:

$$r_{l,r}^2(D_v, y, z; \theta_{1,r}, \varphi_{1,r}, \lambda)f(D_v, y, z; \theta_{1,r}, \varphi_{1,r}, \lambda) = \quad \text{[Formula N]}$$

$$D_v^2 f(D_v, y, z; \theta_e, \varphi_e, \lambda)$$

$$r_{l,r}(D_v, y, z; \theta_{l,r}, \varphi_{l,r}, \lambda) = D_v\sqrt{\frac{f(D_v, y, z; \theta_e, \varphi_e, \lambda)}{f(D_v, y, z; \theta_{l,r}, \varphi_{l,r}, \lambda)}} \quad \text{[Formula O]}$$

Δd', the difference in height in the (θ, φ) direction of a region on the plane having the viewing angle $(-\theta_e, -\varphi_e)$ as the center and four points $(-\theta_e+\theta_d/2,-\varphi_e)$, $(-\theta_e-\theta_d/2,-\varphi_e)$, $(-\theta_e,-\varphi_e+\varphi_d/2)$ and $(-\theta_e,-\varphi_e-\varphi_d/2)$ as apexes may be represented by the following Formula P and Formula Q, respectively.

$$\Delta d'(D_v, y, z; \theta_e, \varphi_e, \lambda) = \quad \text{[Formula P]}$$
$$r_r\left(D_v, y, z; \theta_e + \frac{\theta_d}{2}, \varphi_e, \lambda\right) - r_l\left(D_v, y, z; \theta_e - \frac{\theta_d}{2}, \varphi_e, \lambda\right)$$

$$\Delta d'(D_v, y, z; \theta_e, \varphi_e, \lambda) = \quad \text{[Formula Q]}$$
$$r_r\left(D_v, y, z; \theta_e, \varphi_e + \frac{\varphi_d}{2}, \lambda\right) - r_l\left(D_v, y, z; \theta_e, \varphi_e - \frac{\theta_d}{2}, \lambda\right)$$

A surface slope in the θ direction at one point of the decorative member at a viewing angle of θe satisfies the following Formula R and a surface slope in the φ direction at one point of the decorative member at a viewing angle of $\varphi_e$ satisfies the following Formula S:

$$\frac{\Delta d}{D_v \sin\theta_e \Delta(\theta_e)} = \frac{\delta r}{D_v \sin\theta_e \delta(\theta_e)} \quad \text{[Formula R]}$$

$$\frac{\Delta d}{D_v \Delta(\varphi_e)} = \frac{\delta r}{D_v \delta(\varphi_e)} \quad \text{[Formula S]}$$

Formula R represents a surface slope in the θ direction sensed by the difference in angular luminance, not the actual surface slope at one point on the surface of the decorative member, and Formula S represents a surface slope in the φ direction sensed by the difference in angular luminance, not the actual surface slope at one point on the surface of the decorative member.

The description of aforementioned embodiments associated with the depth parameter value $\delta_{1m}$ may be applied to the depth parameter value $\delta_{1b}$ according to Formula 11, except that, under the conditions of Dv=500 mm, θv=90°, $-15°≤\varphi v≤15°$, φR=0°, θd=90°, and φd=5.7°, φd is used instead of angular resolution (φR) of the detector.

When the depth parameter value $\delta_{1b}$ represented by the following Formula 11 in at least a part of φv from $-15°$ to $+15°$ is 3 or more, surface characteristics with a sense of depth, rather than physical surface characteristics of the decorative layer, can be obtained.

In another embodiment, provided is a decorative member having a depth parameter value $\delta_2$ of 0.3 or more represented by the following Formula 21 in at least a part of the central viewing angle φv from $-15°$ to $+15°$.

$$\Omega_2 = |\Delta d'|max/D_v \quad \text{[Formula 21]}$$

wherein |Δd'|max is the maximum value of Δd' represented by Formula 13 above.

|Δd'|max is the maximum in distance difference according to the difference in angular luminance at points on the y-axis of the decorative layer detected by the detector. In Formula 21, the schematic diagram showing the meaning of |Δd'|max is shown in FIG. 12. When the depth parameter value $\delta_2$ represented by the following Formula 21 in at least a part of φv from $-15°$ to $+15°$ is 0.3 or more, surface characteristics with a sense of depth, rather than physical surface characteristics of the decorative layer, can be obtained.

In another embodiment, provided is a decorative member including one or more points where an absolute value of the value obtained by dividing a slope of an angular luminance graph according to the central viewing angle from $-15°$ to $+15°$ by angular luminance is 0.025 or more. In this case, the angle unit is expressed in "degree (°)". In this case, surface characteristics with a sense of depth, rather than physical surface characteristics of the decorative layer, can be obtained.

Another embodiment of the present specification provides a decorative member including a substrate and a decorative layer provided on the substrate, wherein, when a direction perpendicular to a plane of the decorative layer is defined as an x-axis, a direction on a surface of the decorative layer is defined as a y-axis, and a central point of a width of the y-axis on the decorative layer is detected using a detector under a condition of standard illuminant D65 in a wavelength range of 380 nm≤λ≤780 nm, an angle formed by a line connecting the center of the detector to the central point of the width of the y-axis on the decorative layer with the x-axis on the x-y axis plane is defined as a central viewing angle φv, a distance from the center of the detector to the central point of the width in the y-axis direction on the decorative layer is defined as Dv, and the depth parameter value $\delta_2$ represented by Formula 21 above in at least a part of the central viewing angle φv from $-15°$ to $+15°$ is 0.3 or more. Here, $\varphi_e$ satisfies the range of Formula 6 above. Such a decorative member can have surface characteristics with a sense of depth, rather than physical surface characteristics.

Another embodiment of the present specification provides a decorative member including a substrate and a decorative layer provided on the substrate, wherein, when a direction perpendicular to a plane of the decorative layer is defined as an x-axis, a direction on a surface of the decorative layer is defined as a y-axis, and a central point of the width of the y-axis on the decorative layer is detected using a detector under a condition of standard illuminant D65 in a wavelength range of 380 nm≤λ≤780 nm, an angle formed by a line connecting the center of the detector to the central point of the width of the y-axis on the decorative layer with the x-axis on the x-y axis plane is defined as a central viewing angle φv, and the decorative member includes one or more points where an absolute value of the value obtained by dividing the slope of an angular luminance graph according to the central viewing angle φv from $-15°$ to $+15°$ by angular luminance is 0.025 or more. In this case, the angle unit is expressed in "degree (°)". In this case, the decorative layer can have surface characteristics with a sense of depth, rather than physical surface characteristics.

In another embodiment, the decorative layer includes: a light reflection layer provided on the substrate; or a light absorption layer provided on the substrate; or a light reflection layer provided on the substrate and a light absorption layer provided on the light reflection layer; or a light absorption layer provided on the substrate and a light reflection layer provided on the light absorption layer. FIG. 26 illustrates the structure of the decorative layer.

In another embodiment of the present specification, the light reflection layer or the light absorption layer includes two or more points having different thicknesses.

Another embodiment of the present specification provides a decorative member wherein the light reflection layer or the light absorption layer includes two or more points having different thicknesses.

For example, when the decorative layer has a laminate structure including the light reflection layer and the light absorption layer, light is absorbed via a light incidence path and a light reflection path in the light absorption layer, and light is reflected on the surface of the light absorption layer and the interface between the light absorption layer and the light reflection layer, so that two light reflections undergo constructive or destructive interference. In this specification, light reflected from the surface of the light absorption layer may be expressed as "surface reflected light", and light reflected from the interface between the light absorption layer and the light reflection layer may be expressed as "interface reflected light". FIG. 13 shows a structure in which a substrate 101, a light reflection layer 201 and a light absorption layer 301 are laminated in that order. FIG. 13 illustrates that the substrate is disposed under the light reflection layer, but the present specification is not limited thereto.

The light absorption layer and the light reflection layer will be described with reference to FIG. 31. In the decorative member of FIG. 31, layers are stacked in the order of $L_{i-1}$, $L_i$, and $L_{i+1}$, based on the direction in which light enters, and the interface $I_i$ is disposed between $L_{i-1}$ and $L_i$ layers, and the interface $I_{i+1}$ is disposed between $L_i$ and $I_{i+1}$ layers.

When light having a specific wavelength is emitted in a direction perpendicular to each layer, in order to prevent interference on the thin film, the reflectance at the interface $I_i$ may be represented by the following Equation 1:

$$\frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \quad \text{[Equation 1]}$$

wherein $n_i(\lambda)$ represents a refractive index according to the wavelength $\lambda$ of the $i^{th}$ layer and $k_i(\lambda)$ represents an extinction coefficient according to the wavelength $\lambda$ of the $i^{th}$ layer. The extinction coefficient is an index to define how strongly an object absorbs light at a specific wavelength, and will be defined as follows:

$R_i$, which is defined as a sum of reflectance of the respective wavelengths at the interface $I_i$ calculated at each wavelength using Equation 1, may be represented by the following Equation 2:

$$R_i = \frac{\sum_{\lambda=380nm}^{\lambda=780nm} \frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \Delta\lambda}{\sum_{\lambda=380nm}^{\lambda=780nm} \Delta\lambda} \quad \text{[Equation 2]}$$

Examples of the structure according to the aforementioned embodiment are shown in FIG. 14 and FIG. 15. In FIG. 14 and FIG. 15, a light absorption layer 301 is provided on a light reflection layer 201, and the light absorption layer has two or more points having different thicknesses. As can be seen from FIG. 14, the thickness of the light absorption layer 301 at the point A is different from that at the point B. As can be seen from FIG. 15, the thickness of the light absorption layer 301 in region C is different from that in region D.

In another embodiment of the present specification, the light absorption layer includes at least one region having an inclined surface, the upper surface of which has an inclination angle of more than 0 degrees and not more than 90 degrees, and the light absorption layer includes at least one region having a different thickness from the at least one region having an inclined surface.

The surface characteristics such as inclination degree of the upper surface of the light reflection layer may be the same as those of the upper surface of the light absorption layer. For example, the upper surface of the light absorption layer may be designed to have the same inclination degree as the upper surface of the light reflection layer by using a deposition method when forming the light absorption layer.

FIG. 16 illustrates the structure of a decorative member having a light absorption layer, the top surface of which has an inclined surface. FIG. 16 illustrates a structure in which the substrate 101, the light reflection layer 201 and the light absorption layer 301 are laminated wherein the thickness t1 in the E region of the light absorption layer 301 is different from the thickness t2 in the F region thereof.

FIG. 16 relates to a light absorption layer including inclined surfaces facing each other (that is, cross-sectional surfaces) having a triangular shape. As shown in FIG. 16, the thickness of the light absorption layer may be different on two surfaces having a triangular structure although deposition is conducted under the same conditions in the structure of the pattern having the inclined surfaces facing each other. As a result, a light absorption layer having two or more regions having different thicknesses can be formed by only one process. Therefore, the represented color differs depending on the thickness of the light absorption layer. At this time, when the thickness of the light reflectance layer is not less than a predetermined value, it does not affect color change.

In another embodiment of the present specification, the light absorption layer includes at least one region, thickness of which gradually changes. FIG. 14 illustrates a structure in which the thickness of the light absorption layer gradually changes.

In another embodiment of the present specification, the light absorption layer includes at least one region having an inclined surface, a top surface of which has an inclination angle of more than 0 degrees and not more than 90 degrees, and at least one region having an inclined surface has a structure in which the thickness of the light absorption layer gradually changes. FIG. 17 illustrates a structure of a light absorption layer including a region having an inclined upper surface. In both the G region and the H region shown in FIG. 17, the upper surface of the light absorption layer has an inclined upper surface, and the thickness of the light absorption layer gradually changes.

For example, the light reflection layer or the light absorption layer includes a first region having a first inclined surface, the inclination angle of which is within the range of 1 to 90 degrees, and may further include a second region, an upper surface of which has an inclined surface having a different inclination direction or angle from the first inclined surface, or is horizontal. In this case, the thickness of the light reflection layer or the light absorption layer may be different between the first region and the second region.

For example, the light reflection layer or the light absorption layer includes a first region having a first inclined surface, inclination angle of which is within the range of 1 to 90 degrees, and may further include two or more second regions, an upper surface of which has an inclined surface having a different inclination direction or angle from the first inclined surface, or is horizontal. In this case, the thickness of the light reflection layer or the light absorption layer may be different between the first region and the two or more second regions.

In another embodiment of the present specification, the light reflection layer or the light absorption layer may include a pattern with an asymmetrical structure. In the present specification, the asymmetrical structure means that it has an asymmetrical structure on at least one surface when viewed from the upper surface, side surface or cross-sectional surface. In the case of the asymmetrical structure, the decorative member can exhibit dichroism. The term "dichroism" means that different colors are observed depending on viewing angle.

The color may be represented by CIE Lab and chrominance (color difference) may be defined using the distance ($\Delta E^*ab$) in the Lab space. Specifically, chrominance (color difference) is $\Delta E \cdot ab = \sqrt{(\Delta L)^2 + (\Delta a)^2 + (\Delta b)^2}$ and an observer cannot recognize chrominance within the range of $0 < \Delta E^*ab < 1$ (Reference: Machine Graphics and Vision 20 (4): 383-411). Therefore, in the present specification, dichroism may be defined as "$\Delta E^*ab > 1$".

In one embodiment of the present specification, the light reflection layer, the light absorption layer or a laminate structure of the light reflection layer and the light absorption layer may have dichroism of $\Delta E^*ab > 1$.

In an embodiment of the present specification, the decorative member may have dichroism of $\Delta E^*ab > 1$.

In another embodiment of the present specification, when the light absorption layer includes a pattern, the pattern may be a symmetrical structure, an asymmetrical structure or a combination thereof.

For example, the light absorption layer may further include a pattern having a symmetrical structure. The symmetrical structure includes a prism structure, a lenticular lens structure and the like.

In another embodiment of the present specification, the light absorption layer may include a pattern having an asymmetrical structure.

In one embodiment of the present specification, the light absorption layer includes a protrusion or depression having an asymmetrical cross-sectional surface.

In one embodiment of the present specification, the light absorption layer includes a protrusion having an asymmetrical cross-sectional surface.

In one embodiment of the present specification, the light absorption layer includes a depression having an asymmetrical cross-sectional surface.

In one embodiment of the present specification, the light absorption layer includes a protrusion having an asymmetrical cross-sectional surface and a depression having an asymmetrical cross-sectional surface.

In the present specification, the term "cross-sectional surface" refers to a surface when the protrusion or depression is cut along one direction. For example, the cross-sectional surface may mean a surface when the protrusion or depression is cut along a direction parallel to the ground or perpendicular to the ground when the decorative member is placed on the ground. The protrusion or depression surface of the light absorption layer of the decorative member according to the aforementioned embodiment is characterized in that at least one of cross-sectional surfaces in the direction perpendicular to the ground has an asymmetrical structure.

In the present specification, the term "asymmetrical cross-sectional surface" means that the figure formed by the edge of the cross-sectional surface has a structure having no line or point symmetry. Line symmetry refers to a property of a figure in which the figure overlaps when symmetrically disposed, based on a straight line. Point symmetry means that, when a figure is rotated 180 degrees based on one point, it has a symmetrical property of completely overlapping the original figure. Here, the edge of the cross section of the asymmetrical structure may be a straight line, a curved line or a combination thereof.

In one embodiment of the present specification, the shape of the protrusion or depression having an asymmetrical cross-sectional surface includes at least two sides, at least one cross-sectional surface of which has a different inclination angle or a different curvature, or which have a different side shape. For example, when two sides of the sides constituting at least one cross-sectional surface have different inclination angles, different curvatures, or different side shapes, the protrusion or depression has an asymmetrical structure.

By the protrusion or depression having an asymmetrical cross sectional surface included in the surface of the light absorption layer as described above, the decorative member can exhibit dichroism. The term "dichroism" means that different colors are observed depending on viewing angle. The color representation can be expressed as CIE L*a*b*, and chrominance (color difference) may be defined using the distance ($\Delta E^*ab$) in the L*a*b* space. Specifically, the chrominance (color difference) is $\Delta E \cdot ab = \sqrt{(\Delta L)^2 + (\Delta a)^2 + (\Delta b)^2}$, and an observer cannot recognize chrominance within the range of $0 < \Delta E^*ab < 1$ (Reference: Machine Graphics and Vision 20 (4): 383-411). Therefore, in the present specification, dichroism may be defined as "$\Delta E^*ab > 1$".

In one embodiment of the present specification, the decorative member has a dichroism of $\Delta E^*ab > 1$. Specifically, the color difference $\Delta E^*ab$, which is the distance in the space of L*a*b* in the color coordinate system CIE L*a*b* in the entire decorative member, may be higher than 1.

In one embodiment of the present specification, the color development layer has a dichroism of $\Delta E^*ab > 1$. Specifically, the color difference $\Delta E^*ab$, which is the distance in the space of L*a*b* in the color coordinate system CIE L*a*b* in the color development layer, may be higher than 1.

In one embodiment of the present specification, the shape of the protrusion or depression having an asymmetrical cross-sectional surface includes at least two sides, at least one cross-sectional surface of which has a different inclination angle or a different curvature, or which have a different shape. For example, when two sides of the sides constituting at least one cross-sectional surface have different inclination angles, different curvatures, or different side shapes, the protrusion or depression has an asymmetrical structure.

In one embodiment of the present specification, the shape of the protrusion or depression includes a first inclined surface and a second inclined surface that are different in inclination angle.

In one embodiment of the present specification, the shape of the protrusion or depression includes a first inclined side and a second inclined side, at least one cross-sectional surface of which is different in inclination angle from the others. The shapes of the first inclined side and the second inclined side are the same as or different from each other and each have a straight line or a curved line.

In one embodiment of the present disclosure, the edge of the cross-sectional surface of the asymmetrical structure is a straight line, a curve or a combination thereof.

FIG. 32 shows that the first inclined side and the second inclined surface side have a straight line shape. Each protrusion includes a first region D1 including a first inclined side and a second region D2 including a second inclined side. The first inclined side and the second inclined side have a straight line shape. The angle c3 formed by the first inclined side and the second inclined side may be 75 degrees to 105 degrees. The angle c1 formed by the first inclined side and the ground (substrate) is different from the angle c2 formed by the second inclined side and the ground. For example, the combination of c1 and c2 may be 20 degrees/80 degrees, 10 degrees/70 degrees, or 30 degrees/70 degrees.

FIGS. 33a and 33b show that the first inclined side or the second inclined side has a curved line shape. The cross sectional surface of the light absorption layer has a protrusion shape and the cross sectional surface of the protrusion includes a first region E1 including a first inclined side and a second region E2 including a second inclined side. At least one of the first inclined side and the second inclined side may be a curved line. For example, both the first inclined side and the second inclined side may be a curved line, the first inclined side may be a straight line, and the second inclined side may be a curved line. When the first inclined side has a straight line shape and the second inclined side has a curved line shape, the angle c1 may be larger than the angle c2. FIGS. 33a and 33b show that the first inclined side has a straight line shape and the second inclined side has a curved line shape. The angle formed by the curved inclined side and the ground surface can be calculated from the angle formed by the straight line and the ground surface formed when an arbitrary straight line is drawn from the point where the inclined side contacts the ground, to the point where the first inclined side contacts the second inclined side. The curved second inclined side may have different radiuses of curvature depending on the height of the light absorption layer, and the curved line may have a radius of curvature. The radius of curvature may be 10 times or less the width (E1+E2) of the protrusion. FIG. 33a shows that the radius of curvature of the curved line is twice the width of the protrusion, and FIG. 33b shows that the radius of curvature of the curved line is one time the width of the protrusion. The ratio of the width of the curvature portion (E2) to the width of the protrusion (E1+E2) may be 90% or less. FIGS. 33a and 33b show that the ratio of the width of the curvature portion (E2) to the width of the protrusion (E1+E2) is 60%.

In the present specification, the inclination angle of the inclined side may be used in the same manner as the inclination angle of the inclined surface.

In the present specification, unless stated otherwise, "side" may be a straight line, but the present specification is not limited thereto and the entirety or part thereof may be a curved line. For example, the side may include a part of an arc of a circle or an ellipse, a wave structure, a zigzag structure or the like.

In the present specification, when the side includes a part of an arc of a circle or an ellipse, the circle or an ellipse may have a radius of curvature. The radius of curvature may be defined as a radius of a circular arc when an extremely short region of a curved line is converted into the circular arc.

In the present specification, the inclination angle of the protrusion may mean an angle formed by the inclined surface of the protrusion with the horizontal plane of the light absorption layer. Unless otherwise stated herein, in the drawings, a first inclined surface may be defined as a left inclined surface of the protrusion and the second inclined surface may be defined as a right inclined surface of the protrusion.

In the present specification, unless stated otherwise, the term "inclined side" means a side that has an angle formed by the decorative member and the ground higher than 0 degrees and not higher than 90 degrees, when the decorative member is placed on the ground. In this case, when the side is a straight line, the angle formed by the straight line and the ground can be measured. When the side includes a curved line, an angle formed by the ground surface with a straight line connecting the point closest to the ground surface to the point farthest from the ground surface at the shortest distance can be measured.

In the present specification, unless stated otherwise, the term "inclined surface" means a surface that has an angle formed by a surface of the decorative member with the ground of higher than 0 degrees and not higher than 90 degrees, when the decorative member is placed on the ground. In this case, when the surface is a flat surface, the angle formed by the flat surface with the ground can be measured. When the surface includes a curved surface, an angle formed by the ground surface with a straight line connecting the point closest to the ground surface to the point farthest from the ground surface at the shortest distance can be measured.

In the present specification, unless stated otherwise, the term "inclination angle" means an angle formed by the ground surface with a surface or side constituting the light absorption layer, of higher than 0 degrees and not higher than 90 degrees, when the decorative member is placed on the ground. Alternatively, the angle may mean an angle formed by the ground surface with a line (a'-b') formed when connecting a point (a') where a surface or side constituting the light absorption layer contacts the ground surface, to a point (b') where the light absorption layer is farthest from the ground surface.

In the present specification, unless stated otherwise, the term "curvature" means a variation in the slope of the tangent at successive points on a side or face. As variation in the slope of the tangent at successive points on a side or face increases, curvature increases.

In the present specification, a protrusion may have a protrusion unit shape and a depression may have a depression unit shape. The shape of the protrusion unit or the depression unit means a shape including two inclined sides (first inclined side and second inclined side) and does not mean a shape including three or more inclined sides. Referring to FIG. 36, the protrusion P1 of circle C1 has one protrusion unit shape including a first inclined side and a second inclined side. However, the shape included in circle C2 includes two protrusion units. The first inclined side may be defined as a left inclined side of the protrusion or depression and the second inclined side may be defined as a right inclined side of the protrusion or depression.

In one embodiment of the present specification, the angle formed by the first inclined surface and the second inclined surface may be within the range of 80 degrees to 100 degrees. Specifically, the angle may be 80 degrees or more, 83 degrees or more, 86 degrees or more, or 89 degrees or more, and 100 degrees or less, 97 degrees or less, 94 degrees or less or 91 degrees or less. The angle may include an angle of the apex formed with the first inclined surface with the second inclined surface. When the first inclined surface and the second inclined surface do not form an apex, such an angle may mean an angle of an apex formed by imaginarily extending the first inclined surface and the second inclined surface.

In one embodiment of the present specification, the difference between the inclination angle of the first inclined surface of the protrusion and the inclination angle of the second inclined surface thereof may be within the range of 30 degrees to 70 degrees. The difference between the inclination angle of the first inclined side of the protrusion and the inclination angle of the second inclined side thereof is, for example, 30 degrees or more, 35 degrees or more, 40 degrees or more or 45 degrees or more, and 70 degrees or less, 65 degrees or less, 60 degrees or less or 55 degrees or less. When the difference in inclination angle between the first inclined surface and the second inclined surface is within this range, color representation depending on direction may be advantageous. That is, when the difference in inclination angle of the inclined side is within this range, the thickness of the light absorption layer each formed on the first inclined side and the second inclined side may be changed. For this reason, when the decorative member is viewed from the same direction, dichroism may be increased (See the following Table 1).

TABLE 1

| Difference in inclination angle between first inclined side and second inclined side (°) | First inclined side | | | Second inclined side | | | |
|---|---|---|---|---|---|---|---|
| | $L_1^*$ | $a_1^*$ | $b_1^*$ | $L_2^*$ | $a_2^*$ | $b_2^*$ | $\Delta E^*ab$ |
| 0 | 25.6 | 1.2 | −1.3 | 23.8 | 1.4 | −1.8 | 1.9 |
| 10 | 25.6 | 1.2 | −1.3 | 24.0 | 1.4 | −2.6 | 2.1 |
| 20 | 25.6 | 1.2 | −1.3 | 24.9 | 0.8 | −2.4 | 1.4 |
| 30 | 34.6 | 1.1 | −5.7 | 23.8 | 1.1 | −1.1 | 11.7 |
| 40 | 34.0 | 1.1 | −5.7 | 23.8 | 1.1 | −1.1 | 11.2 |
| 50 | 38.1 | 0.8 | −6.3 | 24.0 | 1.1 | −1.1 | 15.0 |
| 60 | 39.2 | 1.2 | −6.9 | 23.8 | 1.1 | −1.1 | 16.5 |

In one embodiment of the present specification, the cross-section of the protrusion or depression may have a polygonal shape such as a triangular or rectangular shape. FIG. 34 shows that the protrusion has a rectangular shape. The rectangular shape may be a general rectangular shape and there is no particular limitation as to the rectangular shape so long as inclination angles of respective inclined sides are different. The rectangular shape may have a part left after cutting a part of a triangle. For example, the protrusion may be a trapezoid, meaning a square wherein a pair of opposite sides are parallel to each other, or a rectangular that does not have a pair of opposite sides parallel to each other. The protrusion includes a first region F1 including a first inclined side, a second region F2 including a second inclined side and a third region F3 including a third inclined side. The third inclined side may or may not be parallel to the ground. For example, when the rectangular shape is a trapezoid, the third inclined side is parallel to the ground. Any one or more of the first inclined side to the third inclined side may be a curved line and the details of the curved line shape are described above. A sum of lengths of F1+F2+F3 may be defined as the pitch of the protrusion and the details of the pitch are as described above.

FIG. 37 shows a method of defining the shape of the protrusion. For example, the protrusion shape may be obtained by removing a certain region of the ABO1 triangular shape. The removed certain region will be determined as follows. The details of inclination angles c1 and c2 are the same as above.
 1) An arbitrary point P1 on the AO1 line segment dividing the AO1 line segment in the ratio of L1:L2 is set.
 2) An arbitrary point P2 on the BO1 line segment dividing the BO1 line segment in the ratio of m1:m2 is set.
 3) An arbitrary point O2 on the AB line segment dividing the AB line segment in the ratio of n1:n2 is set.
 4) An arbitrary point P3 on the O2O1 line segment dividing the O2O1 line segment in the ratio of o1:o2 is set.

At this time, the ratios of L1:L2, m1:m2, n1:n2 and o1:o2 may be identical or different and may each independently be 1:1000 to 1000:1.

5) A region forming a P1O1P2P3 polygon is removed.
 6) A shape forming an ABP2P3P1 polygon is defined as the cross-section of the protrusion.

The protrusion shape may be variably changed by controlling the ratio of L1:L2, m1:m2, n1:n2 and o1:o2. For example, as L1 and m1 increase, the height of the pattern may increase and, when o1 increases, the height of the depression formed on the protrusion may decrease. By controlling the ratio of n1, the position at the lowest point of the depression formed on the protrusion may be adjusted to be close to any inclined side of the protrusion.

When the ratios of L1:L2, m1:m2 and o1:o2 are the same, the cross-section may have a trapezoidal shape (FIG. 38). The heights of the trapezoid (ha, hb) may be changed by controlling the ratio of L1:L2. For example, FIG. 38a shows the shape of the protrusion produced when the ratio of L1:L2 and the ratio of m1:m2 are 2:3, FIG. 38b shows the shape of the protrusion produced when the ratio of L1:L2 and the ratio of m1:m2 are 1:1, the ratio of m1:m2 is 1:1, and the ratio of o1:o2 is 1:8.

In one embodiment of the present specification, the protrusion or depression shape includes two or more protrusion or depression shapes. When the two or more protrusion or depression shapes are present, dichroism can be improved. At this time, two or more protrusions or depression shapes may include repeated identical shapes, but may include different shapes. Such a structure is shown in FIGS. 39 to 41.

FIG. 39 shows a configuration in which two or more different protrusion shapes are alternately disposed. A configuration in which a second protrusion P2 having a smaller height than the protrusion P1 is disposed between protrusions P1 may be provided. Hereinafter, the protrusion called earlier than the second protrusion may called "first protrusion".

FIG. 40 shows a configuration in which a depression is present between two or more protrusions. The surface of the light absorption layer may further include a depression P3 having a smaller height than the protrusion in a pointed part (sharp point) of the protrusion P1. Such a decorative member can exhibit an effect of providing an image color slightly changed depending on viewing angle.

FIG. 41 shows a reversed angular shape. As such, the light absorption layer may have a protrusion or depression shape and the angular shape may be reversed.

Specifically, as shown in FIG. 41(a), the surface of the light absorption layer may have a configuration in which a plurality of protrusions are reversed 180 degrees. Specifically, the surface of the light absorption layer may include a first region C1 wherein an inclination angle of the second inclined surface is larger than that of the first inclined surface and a second region C2 wherein an inclination angle of the second inclined surface is larger than that of the first inclined surface. For example, the protrusion included in the first region may be referred to as a "first protrusion" P1, and the protrusion included in the second region may be referred to as a "fourth protrusion" P4. The heights of the first protrusion P1 and the fourth protrusion P4, and widths, inclination angles and the angle formed by the first and second inclined surfaces thereof may the same as details described associated with the protrusion P1.

As shown in FIG. 41b, one of the first region and the second region may correspond to an image or logo and the other may correspond to a background part. Such a decorative member can exhibit an effect wherein the image or logo color is slightly changed depending on viewing angle. In addition, the image or logo part and the background part can have the decorative effect of interchangeably representing color according to the viewing direction.

The first region and the second region may each include a plurality of protrusions. The widths of the first region and the second region and the number of the protrusions may be appropriately controlled in consideration of the size of the desired image or logo.

In one embodiment of the present specification, the light absorption layer may further include two or more protrusions and further include a flat portion in a part or the entirety between the respective protrusions.

As shown in FIGS. 35a and 35b the flat portion may be included between respective protrusions of the light absorption layer. The flat portion means a region where no protrusion exists. The descriptions of the remaining elements (D1, D2, c1, c2, c3, first inclined side and second inclined side) are the same as described above, except that the light absorption layer further includes a flat portion. Meanwhile, the total length of D1+D2+G1 is defined as the pitch of the pattern, which is different from the width of the pattern as described above.

The height H1 (e.g., FIG. 39 of the protrusion P1 may be 5 μm to 30 μm. When the height of the protrusion is within the range defined above, there may be an advantage in terms of production process. In this specification, the height of the protrusion may mean the shortest distance between the highest part and the lowest part of the protrusion based on the horizontal plane of the light absorption layer. The description regarding the numerical range of the height of the protrusion as described above may be applied to the depth of the depression as described above.

The width W1 (e.g., FIG. 39) of the protrusion P1 may be 10 μm to 90 μm. When the width of the protrusion is within the range defined above, there may be an advantage in terms of pattern processing and formation processes. The width W1 of the protrusion P1 is, for example, 10 μm or more, 15 μm or more, 20 μm or more or 25 μm or more, and 90 μm or less, 80 μm or less, 70 μm or less, 60 μm or less, 50 μm or less, 40 μm or less or 35 μm or less. The description associated with the width may be applied to the aforementioned depression as well as the protrusion.

The gap between the protrusions P1 may be 0 μm to 20 μm. In this specification, the gap between the protrusions may mean the shortest distance between the point where one protrusion ends and the point where another protrusion starts, in two protrusions. The decorative region should be relatively bright when viewed from the inclined surface having a larger inclination angle of the protrusion. When the gap between the protrusions is appropriately maintained, a phenomenon in which the reflection region is dark due to shading can be improved. A second protrusion having a smaller height than the protrusions may be present between the protrusions, as described later. The description associated with this gap can be applied to the aforementioned protrusion as well as the protrusion.

The height H2 (e.g., FIG. 39) of the second protrusion P2 may range from ⅕ to ¼ of the height H1 of the first protrusion P1. For example, the difference (H1−H2) between the height of the first protrusion and the height of the second protrusion may be 10 μm to 30 μm. The width W2 of the protrusion may be 1 μm to 10 μm. The width W2 of the protrusion may be specifically 1 μm or more, 2 μm or more, 3 μm or more, 4 μm or more, or 4.5 μm or more, and 10 μm or less, 9 μm or less, 8 μm or less, 7 μm or less, 6 μm or less or 5.5 μm or less.

Referring to FIG. 39, in one embodiment of the present specification, the second protrusion may have two inclined surfaces S3 and S4 that differ from each other in inclination angle. The angle a4 formed by the two inclined surfaces of the second protrusion may be 20 degrees to 100 degrees. Specifically, the angle a4 may be 20 degrees or more, 30 degrees or more, 40 degrees or more, 50 degrees or more, 60 degrees or more, 70 degrees or more, 80 degrees or more, or 85 degrees or more, and 100 degrees or less, or 95 degrees or less. The difference (a6−a5) in inclination angle between the two inclined surfaces of the second protrusion may be 0 degrees to 60 degrees. The difference (a6−a5) in inclination angle may be 0 degrees or more, 10 degrees or more, 20 degrees or more, 30 degrees or more, 40 degrees or more, or 45 degrees or more, and 60 degrees or less, or 55 degrees or less. When the dimensions of the second protrusion are within the range defined above, advantageously, light incidence is increased on the side surface having a large inclination surface angle and thus brighter color can be obtained.

Referring to FIG. 40, in one embodiment of the present specification, the height H3 of the depression P3 may be 3 μm to 15 μm. The height H3 of the depression P3 is specifically 3 μm or more, and 15 μm or less, 10 μm or less, or 5 μm or less. The depression may have two inclined surfaces S5 and S6 that differ from each other in inclination angle. The angle a7 formed by the two inclined surfaces of the depression may be 20 degrees to 100 degrees. The angle a7 may be specifically 20 degrees or more, 30 degrees or more, 40 degrees or more, 50 degrees or more, 60 degrees or more, 70 degrees or more, 80 degrees or more or 85 degrees or more, and 100 degrees or less or 95 degrees or less. The difference (a9−a8) in inclination angle between the inclined surfaces of the depression may be 0 degrees to 60 degrees. The difference (a9−a8) in inclination angle may be 0 degrees or more, 10 degrees or more, 20 degrees or more, 30 degrees or more, 40 degrees or more or 45 degrees or more, and 60 degrees or less or 55 degrees or less. When the dimensions of the depression are within this range, there is an advantage that color sense can be added to the mirror surface.

For example, the light reflection layer or light absorption layer has an upper surface with a pattern having a conical protrusion or depression. The cone includes a cone, an elliptical cone or a faceted cone. Here, the bottom surface shape of the faceted cone includes a triangular shape, a rectangular shape, a star shape with five or more protrusions, or the like. The cone may have a shape of a protrusion formed on the upper surface of the light reflection layer or light absorption layer, or of a depression formed on the upper surface of the light absorption layer. The protrusion has a triangular cross-sectional shape and the depression has a reversed triangular cross-sectional shape. The bottom surface of the light reflection layer or the light absorption layer may have the same shape as the top surface of the light absorption layer.

For example, the conical pattern may be asymmetrical. For example, when the cone-shaped pattern is observed from the upper surface, in the case where there are three or more identical shapes when rotating 360 degrees with respect to the vertex of the cone, dichroism is hardly expressed from the pattern. However, when the cone-shaped pattern is observed from the upper surface, dichroism can be expressed when there are two or fewer of the same shapes when the cone rotates 360 degrees with respect to the vertex of the cone. FIG. 18 shows the upper surface of a conical shape. FIG. 18 shows a symmetrical conical shape, and also shows an asymmetrical conical shape.

The symmetrical cone shape refers to a structure in which the bottom face of the conical shape is a circle, or a regular polygon having the same length on each side and the vertex of the cone is present on the perpendicular line of the center of gravity of the bottom surface. However, the asymmetrical conical shape, when viewed from the upper surface, refers to a structure in which the position of the vertex of the cone is present on the perpendicular line of the point rather than the center of gravity of the ground surface, or the bottom surface has an asymmetrical polygonal or elliptical shape. When the bottom surface has an asymmetrical polygonal shape, at least one of the sides or angles of the polygon can be designed differently from others.

For example, as shown in FIG. 19, the position of the vertex of the cone can be changed. Specifically, when the vertex of the cone is designed to be positioned on the perpendicular line of the center of gravity 01 of the ground, when viewed from the top, as shown in the first diagram of FIG. 19, four identical structures can be obtained when rotating 360 degrees based on the vertex of the cone (4-fold symmetry). However, the symmetrical structure is broken by designing the vertex of the cone at the position 02 rather than the center of gravity 01 of the ground surface. The length of one side of the bottom surface is set to x, the movement distances of the vertex of the cone are set to a and b, the height of the cone shape, which is the length of the line perpendicularly connecting the vertex (01 or 02) of the cone to the ground surface, is set to h, and the angle formed by the ground surface with the side surface of the cone is set to θn the following coincidence values can be obtained for Face 1, Face 2, Face 3 and Face 4 in FIG. 19.

$$\cos(\Theta 1) = \frac{\left(\frac{x}{2}\right)}{sqrt\left(h^2 + \left(\frac{x}{2}\right)^2\right)}$$

$$\cos(\Theta 2) = \frac{\left(\frac{x}{2}\right)}{sqrt\left(h^2 + \left(\frac{x}{2}\right)^2\right)}$$

$$\cos(\Theta 3) = \frac{\left(\frac{x}{2} - a\right)}{sqrt\left(h^2 + \left(\frac{x}{2} - a\right)^2\right)}$$

$$\cos(\Theta 4) = \frac{\left(\frac{x}{2} - b\right)}{sqrt\left(h^2 + \left(\frac{x}{2} - b\right)^2\right)}$$

In this case, θ1 and θ2 are identical and thus there is no dichroism. However, θ3 and θ4 are different and |θ3−θ4| means color difference (chrominance) between two colors (ΔE*ab), thus exhibiting dichroism. Here, |θ3−θ4|>0. Thus, the angle between the bottom surface and the side surface of the cone quantitatively indicates how a symmetrical structure is broken, that is, the degree of asymmetry, and the numerical value indicating the degree of asymmetry is proportional to the chrominance of dichroism.

According to another example, the light reflection layer or the light absorption layer includes a pattern in which the top point has a linear protrusion or the bottom point has a linear depression. The linear shape may be a straight line, a curved line, or both a straight line and a curved line. When a pattern having a linear protrusion or depression is viewed from the upper surface, dichroism is hardly exhibited, in the case where two or more identical shapes are present when the center of gravity of the upper surface is rotated 360 degrees. However, dichroism can be exhibited in the case where there is only one identical shape when rotated 360 degrees with respect to the center of gravity of the upper surface, when viewing a pattern having a linear protrusion or depression from the upper surface. FIG. 20 shows a top surface of a pattern having a linear protrusion, wherein (a) shows a pattern having a linear protrusion that does not exhibit dichroism, and (b) shows a linear protrusion that exhibits dichroism. The cross-section taken along X-X' of FIG. 20(*a*) is an isosceles triangle or an equilateral triangle, and the cross-section taken along Y-Y' of FIG. 20(*b*) is a triangle having sides having different lengths.

According to another example, the light reflection layer or the light absorption layer includes a pattern having a protrusion or depression, a conical upper surface of which is cut-out. The cross-section of such a pattern may have a trapezoidal or inverted trapezoidal shape. Also, in this case, dichroism can be expressed by designing the upper surface, the side surface, or the cross sectional surface, each having an asymmetrical structure.

Various protrusions or depression patterns as shown in FIG. 21 may be implemented in addition to the structures exemplified above.

In one embodiment of the present specification, the light absorption layer includes a pattern including a top point having a linear protrusion, or a bottom point having a linear depression. The linear shape may be a straight line, a curved line, or both a straight line and a curved line, or a zigzag. This configuration is shown in FIGS. 42 to 45. When the surface of the configuration in which the top point has a linear protrusion or the bottom point has a linear depression is viewed from the surface of the protrusion or depression shape, in the case where there is only one identical shape when rotated 360 degrees from the center of gravity of the upper surface, upon viewing a pattern having a linear protrusion or depression from the top, advantageously, dichroism can be easily exhibited.

In one embodiment of the present specification, the light absorption layer has a surface with a pattern having a protrusion or depression, a conical pointed part (peak) of which is cut-out. FIG. 45 contains images showing an inverted trapezoidal depression having an asymmetrical cross section perpendicular to the ground surface, when the decorative member is placed on the ground. Such an asymmetrical cross section may be a trapezoidal or inverted trapezoidal shape. Even in this case, dichroism can be expressed by the asymmetrical cross-sectional structure.

The light absorption layer can exhibit various colors according to the refractive index (n), the extinction coefficient (k) and the thickness (t). FIG. 22 shows the reflectance of each wavelength according to the thickness of the light absorbing layer, and FIG. 23 shows colors obtained according to the thickness of the light absorption layer. Specifically, FIG. 22 is a graph of a reflectance simulation graph of CuO/Cu depending on CuO deposition thickness, which is data obtained by changing the thickness of CuO within the range of 10 to 60 nm under the same deposition conditions.

FIG. 24 is a simulation result showing that a different color is observed depending on viewing angle. FIG. 24 shows a simulation result of CuON/Al. In FIG. 24, the thickness of the light absorbing layer is increased from 10 nm to 100 nm by 10 nm, and the angle of incidence is adjusted from 0 to 60 degrees at intervals of 15 degrees. It can be seen from the simulation result that various colors can be realized by adjusting the thickness of the light absorption layer and the inclination angle of the upper surface in the structure according to the embodiment of the present specification.

In FIG. 24, L*a*b* coordinate values of A1 to A5 are (91,3,5), L*a*b* coordinate values of B1 to B5 are each (74,14,8), (74,14,8), (72,15,10), (69,15,11) and (66,16,13), L*a*b* coordinate values of C1 to C5 are each (46,22,−11), (45,22,−10), (43,25,−9), (40,28,−4), and (42,30,6), L*a*b* coordinate values of D1 to D5 are (36,−12,−22), (35,−11,−23), (30,−7,−24), (20,6,−26), and (18,38,−12), L*a*b* coordinate values of E1 to E5 are each (49,−20,−7), (48,−20,−7), (43,−20,−8), (34,−18,39), and (18,7,−10), L*a*b* coordinate values of F1 to F5 are each (60,−10,4), (59,−10,4), (55,−11,4), (47,−11,4), and (31,−4,3), L*a*b* coordinate values of G1 to G5 are each (66,−4,10), (65,−4,10), (62,−4,10), (54,−5,11), and (40,−2,10), L*a*b* coordinate values of H1 to H5 are each (69,1,11), (68,1,12), (64,1,13), (58,1,14), and (44,2,13), L*a*b* coordinate values of I1 to I5 are each (68,5,11), (67,5,11), (64,5,12), (58,6,14) and (41,7,14), and L*a*b* coordinate values of J1 to J5 are each (66,8,8), (65,8,8), (62,8,10), (56,9,11), and (43,11,11).

The light reflection layer is not particularly limited as long as it is a material capable of reflecting light, but the light reflectance can be determined depending on the material, and for example, the color can be easily realized at light reflectance of 50% or more. The light reflectance can be measured using an ellipsometer.

The light absorption layer preferably has a refractive index (n) at 400 nm of 0 to 8, 0 to 7, 0.01 to 3, and 2 to 2.5. The refractive index n can be calculated by $\sin \theta 1/\sin \theta 2$ (wherein $\theta 1$ is the angle of light incident from the surface of the light absorption layer, and $\theta 2$ is the angle of light refracted within the light absorption layer).

The light absorption layer preferably has a refractive index (n) at 380 to 780 nm of 0 to 8, 0 to 7, 0.01 to 3, or 2 to 2.5.

The light absorption layer has an extinction coefficient (k) at 400 nm of more than 0 and not more than 4, preferably 0.01 to 4, 0.01 to 3.5, 0.01 to 3, or 0.1 to 1. The extinction coefficient k is represented by $-\lambda/(4\pi I)(dI/dx)$, which is obtained by multiplying the decrease rate (dI/I) of the intensity of light per unit length (dx) of the route in the light absorption layer (for example, 1 m) by $\lambda/4\pi$, wherein $\lambda$ is the wavelength of light.

The light absorption layer has an extinction coefficient (k) at 380 to 780 nm of more than 0 and not more than 4, preferably 0.01 to 4, 0.01 to 3.5, 0.01 to 3, or 0.1 to 1.

Since the extinction coefficient (k) in the entire visible wavelength range of 400 nm, preferably 380 to 780 nm is within the range defined above, the light absorption layer can function normally within the visible light range.

For example, the light absorption spectrum when using a method of absorbing light by adding a dye to a resin is different from that when using a material having the extinction coefficient as defined above. When absorbing light by adding a dye to a resin, the absorption wavelength band is fixed and the absorption amount changes only depending on change in coating thickness. Further, in order to obtain a desired light absorption amount, a thickness variation of at least several micrometers is necessary in order to control the light absorption amount. On the other hand, a material having an extinction coefficient shows a variation in the wavelength band of light to be absorbed although the thickness changes on the scale of several to several tens of nanometers.

In one embodiment, the light reflection layer may be a metal layer, a metal oxynitride layer, or an inorganic layer.

The light reflection layer may be composed of a single layer, or multiple layers including two or more layers.

For example, the light reflection layer may be a single layer or multiple layers including one or more materials selected from indium (In), titanium (Ti), tin (Sn), silicon (Si), germanium (Ge), aluminum (Al), copper (Cu), nickel (Ni), vanadium, (V), tungsten (W), tantalum (Ta), molybdenum (Mo), neodymium (Nb), iron (Fe), chromium (Cr), cobalt (Co), gold (Au) and silver (Ag), an oxide, nitride or oxynitride thereof, or one or more materials of carbon and carbon composites. For example, the light reflection layer may include an alloy of two or more selected from the aforementioned materials, or an oxide, nitride or oxynitride thereof. For example, the light reflection layer may include an alloy of two or more selected from the metals. More specifically, the light reflection layer may include molybdenum, aluminum or copper. According to another example, the light reflection layer may be produced using an ink including carbon or a carbon composite, so that the light reflection layer can realize a high-resistance. Examples of the carbon or carbon composite include carbon black, CNT and the like. The ink including carbon or carbon composite may include the above-mentioned material or oxide, nitride or oxynitride thereof, for example, at least one oxide selected from indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au) and silver (Ag). After printing the ink including carbon or a carbon composite, a curing process may be further performed.

When the light reflection layer includes two or more materials, the two or more materials may be formed by a single process, for example, a deposition or printing method. However, after one layer is formed with one or more materials, another layer is further formed thereon with one or more materials. For example, indium or tin is deposited to form a layer, an ink containing carbon is printed and cured to form a light reflection layer. The ink may further include an oxide such as titanium oxide or silicon oxide.

According to one embodiment, the light absorption layer may include a single layer, or multiple layers of two or more layers. The light absorption layer may be formed of a material having an extinction coefficient (k) at 380 to 780 nm, that is, a material having an extinction coefficient of more than 0 and not more than 4, preferably of 0.01 to 4. For example, the light absorption layer may include one or more selected from the group consisting of metals, metalloids, and oxides, nitrides, oxynitrides and carbides of metals or metalloids. The oxides, nitrides, oxynitrides or carbides of metals or metalloids may be formed under deposition conditions determined by those skilled in the art. The light absorption layer may contain the same metal, metalloid, alloy or oxynitride of two or more types as the light reflection layer.

For example, the light absorption layer may include a single layer or multiple layers including at least one material selected from indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au) and silver (Ag), or an oxide, nitride or oxynitride thereof. As a specific example, the light absorption layer includes one or more selected from copper oxide, copper nitride, copper oxynitride, aluminum oxide, aluminum nitride, aluminum oxynitride and molybdenum titanium oxynitride.

For example, the light absorption layer includes silicon (Si) or germanium (Ge).

The light absorption layer composed of silicon (Si) or germanium (Ge) has a refractive index (n) at a wavelength of 400 nm of 0 to 8, or 0 to 7 and an extinction coefficient (k) greater than 0 and not greater than 4, preferably 0.01 to 4, 0.01 to 3, or 0.01 to 1.

For example, the light absorption layer includes one or two selected from copper oxide, copper nitride, copper oxynitride, aluminum oxide, aluminum nitride, aluminum oxynitride and molybdenum titanium oxynitride. In this case, the light absorption layer may have a refractive index (n) at 400 nm of 1 to 3, for example, 2 to 2.5, and an extinction coefficient (k) of greater than 0 and not greater than 4, preferably 0.01 to 2.5, more preferably 0.2 to 2.5, even more preferably 0.2 to 0.6.

For example, the light absorption layer is $AlO_xN_y$ (x>0, y>0).

According to another example, the light absorption layer may be $AlO_xN_y$ (0≤x≤1.5, 0≤y≤1).

According to another example, the light absorption layer is made of $AlO_xN_y$ (x>0, y>0) and a ratio of the number of respective atoms with respect to 100% of the total number of atoms satisfies the following formula:

$$1 < \frac{(Al)\,at \times 3}{(O)\,at \times 2 + (N)\,at \times 3} < 2$$

In one embodiment, the light absorption layer may be made of a material having an extinction coefficient (k) at 400 nm, preferably 380 to 780 nm. For example, the light absorption layer/light reflection layer may be made of a material such as CuO/Cu, CuON/Cu, CuON/Al, AlON/Al, AlN/AL/AlON/Cu, or AlN/Cu.

In one embodiment, the thickness of the light reflection layer can be determined according to a desired color in the final structure, and is, for example, 1 nm or more, preferably 25 nm or more, for example, 50 nm or more, preferably 70 nm or more.

In one embodiment, the thickness of the light absorption layer may be 5 to 500 nm, for example 30 to 500 nm.

In one embodiment, the difference in thickness between regions of the light absorption layer is 2 to 200 nm and can be determined according to a desired color difference.

In one embodiment, the light reflection layer may further include a substrate provided on the lower surface of the light reflection layer or on the upper surface of the light absorption layer. The surface characteristics such as inclination degree of the upper surface of the substrate may be the same as those of the upper surface of the light reflection layer and the light absorption layer. This is because the light reflection layer and the light absorption layer are formed by deposition, so that the substrate, the light reflection layer and light absorption layer can have inclined surfaces with the same angle. For example, such a structure can be realized by forming an inclined surface or a three-dimensional structure on an upper surface of a substrate, and sequentially depositing a light reflection layer and a light absorption layer on the substrate, or sequentially depositing a light absorption layer and a light reflection layer.

For example, the formation of the inclined surface or the three-dimensional structure on the surface of the substrate can be carried out by forming a pattern on an ultraviolet curable resin and curing the resin using ultraviolet light, or by laser processing. In one embodiment, the decorative member may a decorative film or a case of a mobile device. The decorative member may further include an adhesive layer, as needed.

The material for the substrate is not particularly limited and may be a UV-curable resin known in the art, when forming an inclined surface or a three-dimensional structure in the aforementioned manner.

A protective layer may be further provided on the light absorption layer.

For example, an adhesive layer may be further provided on the opposite surface of the substrate provided with the light absorption layer or the light reflection layer. The adhesive layer may be an optically clear adhesive (OCA) layer. A release liner for protection may be further provided on the adhesive layer, if necessary.

Although a deposition method such as sputtering has been described as an example of a method of forming the light reflection layer and the light absorption layer, a variety of methods for producing a thin film may be applied, so long as the structures and characteristics according to the embodiments described herein can be obtained. For example, vapor deposition, chemical vapor deposition (CVD), wet coating, or the like can be used.

Hereinafter, the present specification will be described in more detail with reference to the following examples. These examples are provided only for illustration and should not be construed as limiting the scope of the present specification.

Examples 1 to 4, Comparative Examples 1 to 3

For Films #1 to #7, the depth parameter value $\delta_{1m}$ of Formula 1 depending on the central viewing angle φv under the conditions of θv=90° and Dv=500 mm is shown in Table 2 and FIG. 8. A PET film was used as the substrate. Film #1 was a flat film made of aluminum including a mirror thermally deposited as a decorative layer; Film #2 was a film including aluminum oxide deposited on an unpatterned flat plane; Film #3 was a non-prismatic pattern film including a colloidal absorption layer, more particularly, a colloidal absorption layer pattern film having a rectangular cross-sectional surface with a pitch of 200 μm, a fill factor of 25% and a height of 50 μm, wherein the fill factor is defined as a ratio of the filled colloid absorbing layer with respect to the total pitch of 200 μm; Film #4 was an asymmetrical prismatic film made of aluminum oxide and having a pitch of 77.8 μm, a height of 25 μm and a base angle of 20°/70°; Film #5 was an asymmetrical prismatic film made of aluminum oxide and having a thickness of 77.8 μm, a pitch of 25 μm and a base angle of 14°/76°; Film #6 was an asymmetrical prismatic film including a multilayer thin film with a pitch of 77.8 μm, a pitch of 25 μm and a base angle of 20°/70°; and Film #7 was a symmetrical prismatic film including a multilayer thin film with a pitch of 77.8 μm, a height of 25 μm and a base angle of 45°/45°. Film #6 and Film #7 have three-layer thin film structures including a $TiO_2$ layer (thickness: 50 nm), an $SiO_2$ layer (thickness: 100 nm) and a $TiO_2$ layer (thickness: 100 nm)

TABLE 2

| Item | Type of film | Central viewing angle [°]/$\delta_{1m}$ | | | | | | |
|---|---|---|---|---|---|---|---|---|
| | | −15 | −10 | −5 | 0 | 5 | 10 | 15 |
| Comparative Example 1 | Film #1 | 0.00 | 0.00 | 0.00 | 0.00 | 0.00 | 0.00 | 0.00 |
| Comparative Example 2 | Film #2 | 0.03 | 0.02 | 0.00 | 0.00 | 0.00 | 0.01 | 0.03 |
| Example 1 | Film #3 | 0.24 | 0.34 | 0.20 | 0.05 | 0.20 | 0.34 | 0.25 |
| Example 2 | Film #4 | 0.06 | 0.11 | 0.18 | 0.24 | 0.19 | 0.08 | 0.01 |
| Example 3 | Film #5 | 0.24 | 0.19 | 0.08 | 0.01 | 0.01 | 0.02 | 0.03 |
| Example 4 | Film #6 | 0.08 | 0.14 | 0.29 | 0.46 | 0.46 | 0.23 | 0.05 |
| Comparative Example 3 | Film #7 | 0.07 | 0.05 | 0.03 | 0.01 | 0.02 | 0.05 | 0.07 |

The central viewing angle of a positive value (+) or a negative value (−) means that the positions of the detector are opposite to each other with respect to the x-axis on the decorative layer.

As can be seen from Table 2, the non-prismatic film of Film #3 and the asymmetrical prismatic films of Films #4 to #6 have a depth parameter value $\delta_{1m}$ of 0.15 or more represented by Formula 1 above in at least part of the central viewing angle φv of −15° to +15°, while the remaining Films #1, #2, and #7 have a depth parameter value $\delta_{1m}$ of 0.15 or less represented by Formula 1 above in at least part of the central viewing angle φv of −15° to +15°. Specifically, Film #3 has a depth parameter value $\delta_{1m}$ of 0.15 or more represented by Formula 1 at a central viewing angle φv of −15° to −5° and 5° to 15°, Film #4 has a depth parameter value $\delta_{1m}$ of 0.15 or more represented by Formula 1 at a central viewing angle φv of −5° to +5°, Film #5 has a depth parameter value $\delta_{1m}$ of 0.15 or more represented by Formula 1 at a central viewing angle φv of −15° to −10°, and Film #6 has a depth parameter value $\delta_{1m}$ of 0.15 or more represented by Formula 1 at a central viewing angle φv of −5° to +10°. Films #3 to #6, having a depth parameter value $\delta_{1m}$ of 0.15 or more represented by Formula 1 above in at least part of the central viewing angle φv of −15° to +15°, provide surface characteristics with a sense of depth, regardless of the pattern shape on the surface of the actual film, while Films #1, #2, and #7 could not provide surface characteristics with a sense of depth. For Films #1 to #7, the depth parameter value $\delta_{1b}$ represented by Formula 11 above at a central viewing angle φv under the conditions of θv of 90 degrees and Dv of 500 mm is shown in Table 3 and FIG. 11.

TABLE 3

| Item | Type of film | Central viewing angle [°]/$\delta_{1b}$ | | | | | | |
|---|---|---|---|---|---|---|---|---|
| | | −15 | −10 | −5 | 0 | 5 | 10 | 15 |
| Comparative Example 1 | Film #1 | 0.00 | 0.00 | 0.00 | 0.00 | 0.00 | 0.00 | 0.00 |
| Comparative Example 2 | Film #2 | 0.58 | 0.33 | 0.03 | 0.05 | 0.07 | 0.29 | 0.50 |
| Example 1 | Film #3 | 4.46 | 6.41 | 3.89 | 1.09 | 4.01 | 6.22 | 4.48 |
| Example 2 | Film #4 | 1.20 | 2.18 | 3.46 | 4.40 | 3.65 | 1.51 | 0.24 |
| Example 3 | Film #5 | 4.40 | 3.65 | 1.51 | 0.24 | 0.20 | 0.29 | 0.81 |
| Example 4 | Film #6 | 1.41 | 2.91 | 5.59 | 8.65 | 8.66 | 4.43 | 1.17 |
| Comparative Example 3 | Film #7 | 1.39 | 1.01 | 0.49 | 0.13 | 0.49 | 0.98 | 1.38 |

As can be seen from Table 3, the non-prismatic film of Film #3 and the asymmetrical prismatic films of Films #4 to #6 have a depth parameter value $\delta_{1b}$ of 3 or more represented by Equation 11 above in at least part of the central viewing angle φv of −15° to +15°, while the remaining Films #1, #2, and #7 have a depth parameter value $\delta_{1b}$ of 3 or less represented by Equation 11 above in at least part of the central viewing angle φv of −15° to +15°. Specifically, Film #3 has a depth parameter value $\delta_{1b}$ of 3 or more at a central viewing angle φv of −15° to −5° and 5° to 15°, Film #4 has a depth parameter value $\delta_{1b}$ of 3 or more represented by Formula 11 at a central viewing angle φv of −5° to +5°, Film #5 has a depth parameter value $\delta_{1b}$ of 3 or more represented by Formula 11 at a central viewing angle φv of −15° to −10°, and Film #6 has a depth parameter value $\delta_{1b}$ of 3 or more represented by Formula 11 at a central viewing angle φv of −5° to +10°.

For Films #1 to #7, the depth parameter value $\delta_2$ represented by Formula 21 above at a central viewing angle φv under the conditions of θv of 90 degrees and Dv of 500 mm is shown in Table 4 and FIG. 25.

TABLE 4

| Item | Type of film | Central viewing angle [°]/$\delta_2$ | | | | | | |
|---|---|---|---|---|---|---|---|---|
| | | −15 | −10 | −5 | 0 | 5 | 10 | 15 |
| Comparative Example 1 | Film #1 | 0.00 | 0.00 | 0.00 | 0.00 | 0.00 | 0.00 | 0.00 |
| Comparative Example 2 | Film #2 | 0.07 | 0.07 | 0.03 | 0.02 | 0.03 | 0.06 | 0.06 |
| Example 1 | Film #3 | 0.70 | 0.71 | 0.69 | 0.39 | 0.70 | 0.69 | 0.69 |
| Example 2 | Film #4 | 0.18 | 0.34 | 0.45 | 0.45 | 0.46 | 0.37 | 0.13 |
| Example 3 | Film #5 | 0.45 | 0.46 | 0.37 | 0.13 | 0.04 | 0.04 | 0.45 |
| Example 4 | Film #6 | 0.22 | 0.52 | 0.87 | 0.95 | 0.98 | 0.90 | 0.40 |
| Comparative Example 3 | Film #7 | 0.15 | 0.14 | 0.09 | 0.05 | 0.10 | 0.13 | 0.15 |

As can be seen from Table 4, the non-prismatic film of Film #3 and the asymmetrical prismatic films of Films #4 to #6 have a depth parameter value $\delta_2$ of 0.3 or more represented by Formula 21 above in at least part of the central viewing angle φv of −15° to +15°, while the remaining Films #1, #2, and #7 have a depth parameter value $\delta_2$ of less than 0.3 represented by Formula 21 above in at least part of the central viewing angle φv of −15° to +15°. Specifically, Film #3 has a depth parameter value $\delta_2$ of 0.3 or more at a central viewing angle φv of −15° to 15°, Film #4 has a depth parameter value $\delta_2$ represented by Formula 21 of 0.3 or more at a central viewing angle φv of −10° to +10°, Film #5 has a depth parameter value $\delta_2$ represented by Formula 21 of 0.3 or more at a central viewing angle φv of −15° to −5°, and Film #6 has a depth parameter value $\delta_2$ represented by Formula 21 of 0.3 or more at a central viewing angle φv of −10° to +15°.

For Films #1 to #7, the distribution of angular luminance at a central viewing angle φv under the conditions of θv of 90 degrees and Dv of 500 mm is shown in FIG. 9(a) and the value obtained by dividing the slope of the angular luminance distribution graph of FIG. 9(a) by the corresponding luminance is shown in FIG. 9(b).

Example 5

An asymmetrical prismatic film was tested in the same manner as the asymmetrical prismatic film of Film #4 (Example 2) except that the pitch was changed to 0.1 mm. The angular luminance at the center of the decorative member is shown in FIG. 27. In addition, angular luminance at a point 2.5 mm away from the center of the decorative member is shown FIG. 28. As can be seen from FIGS. 27 and 28, when the pitch of the pattern of the decorative member is less than 1 mm, the angular luminance at the center of the decorative member is the same as the angular luminance at the point 2.5 mm away from the center of the decorative member.

Example 6

An asymmetrical prismatic film was tested in the same manner as the asymmetrical prismatic film of Film #4 (Example 2) except that the pitch was changed to 10 mm. The angular luminance at the center of the decorative member is shown in FIG. 29. In addition, angular luminance at a point 2.5 mm away from the center of the decorative member is shown FIG. 30. As can be seen from FIGS. 29 and 30, when the pitch of the pattern of the decorative member is greater than 1 mm, the angular luminance at the center of the decorative member is the same as the angular luminance at the point 2.5 mm away from the center of the decorative member.

The invention claimed is:

1. A decorative member comprising:
   a substrate; and
   a decorative layer provided on the substrate,
   wherein the decorative layer has a pattern of protrusions arranged in one dimension and a pitch in a one-dimensional direction of the pattern is smaller than 1 mm, or arranged in two dimensions and each pitch in a two-dimensional direction of the pattern is smaller than 1 mm, wherein the protrusions have an asymmetrical structure,
   wherein the asymmetrical structure comprises:
      an asymmetrical conical shape, wherein (i) the asymmetrical conical shape, when viewed from an upper surface thereof, has a structure with a base and a vertex of the conical shape on a line perpendicular to the base, and the position of the vertex is a point that does not coincide with the center of gravity of the base; or
      (ii) the base of the asymmetrical conical shape has an asymmetrical polygonal or elliptical shape,
   wherein the decorative layer comprises a light reflection layer provided on the substrate and a light absorption layer provided on the light reflection layer, or a light absorption layer provided on the substrate and a light reflection layer provided on the light absorption layer,
   wherein the light reflection layer has a thickness of 1 nm or more, and the light absorption layer has a thickness of 5 to 500 nm,
   wherein the light reflection layer or the light absorption layer comprises two or more points having different thicknesses,
   wherein the light reflection layer has a light reflectance of 50% or more,
   wherein the light absorption layer has a refractive index (n) at 380 nm to 780 nm of 0 to 8, and an extinction coefficient (k) at 380 nm to 780 nm of more than 0 and not more than 4,
   wherein the light reflection comprises one or more materials selected from indium (In), titanium (Ti), tin (Sn), silicon (Si), germanium (Ge), aluminum (Al), copper (Cu), nickel (Ni), vanadium, (V), tungsten (W), tantalum (Ta), molybdenum (Mo), neodymium (Nb), iron (Fe), chromium (Cr), cobalt (Co), gold (Au) and silver (Ag), an oxide, nitride or oxynitride thereof, or one or more materials of carbon and carbon composites,
   wherein the light absorption layer one or more materials selected from indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au) and silver (Ag), or an oxide, nitride or oxynitride thereof,
   wherein, when a direction perpendicular to a plane of the decorative layer is defined as an x-axis, a direction on a surface of the decorative layer is defined as a y-axis, and a central point of the width of the y-axis on the decorative layer is detected using a detector under a condition of standard illuminant D65 in a wavelength range of 380 nm<λ≤780 nm, an angle formed by a line connecting the center of the detector to the central point of the width of the y-axis on the decorative layer with the x-axis on the x-y axis plane is defined as a central viewing angle φv, a distance from the center of the detector to the central point of the width in the y-axis direction on the decorative layer is defined as Dv, and a depth parameter value $\delta_{1m}$ represented by the following Formula 1 in at least a part of the central viewing angle φv from −15° to +15° is 0.15 or more:

$$\delta_{1m}=|\Delta h|\max/D_v \qquad \text{[Formula 1]}$$

wherein |Δh|max is the maximum value of Δh represented by the following Formula 2:

$$\Delta h = \int_{\varphi e,min}^{\varphi e} \Delta d'\, d\varphi e \qquad \text{[Formula 2]}$$

wherein Δd is represented by the following Formula 3:

$$\Delta d = r(\varphi_e+0.15°)-r(\varphi_e-0.15°) \qquad \text{[Formula 3]}$$

wherein
$\varphi_e$ is defined as a viewing angle formed by a line connecting the center of the detector to any point on the y axis on the decorative layer detected by the detector with the x-axis on the x-y axis plane; and
$r(\varphi_e+0.15°)$ and $r(\varphi_e-0.15°)$ are represented by the following Formula 4 and the following Formula 5, respectively:

$$r(\varphi_e+0.15°)=Dv\times\sqrt{f(\varphi e+0.15°)/f(\varphi e)} \qquad \text{[Formula 4]}$$

$$r(\varphi_e-0.15°)=Dv\times\sqrt{f(\varphi e-0.15°)/f(\varphi e)} \qquad \text{[Formula 5]}$$

wherein f(φe), f(φe+0.15°) and f($\varphi_e$−0.15°) are angular luminances at viewing angles ($\varphi_e$), ($\varphi_e$+0.15°) and ($\varphi_e$−0.15°), respectively,
wherein $\varphi_e$ satisfies the range of the following Formula 6:

$$-\tan^{-1}(100 \text{ mm}/2Dv)+0.15°+\varphi_v=\varphi_e,\min\leq\varphi_e\leq\varphi_e,\max=\tan^{-1}(100 \text{ mm}/2Dv)-0.15°+\varphi_v \qquad \text{[Formula 6]}$$

wherein $\varphi_e$,min and $\varphi_e$,max are the minimum and the maximum of $\varphi_e$, respectively.

2. The decorative member of claim 1, wherein a depth parameter value $\delta_{1b}$ represented by the following Formula 11 in at least a part of the central viewing angle φv from −15° to +15° is 3 or more:

$$\delta_{1b}=|\Delta h'|\max/Dv \qquad \text{[Formula 11]}$$

wherein |Δh'|max is the maximum value of Δh' represented by the following Formula 12:

$$\Delta h' = \int_{\varphi e,min}^{\varphi e} \Delta d'\, d\varphi e \qquad \text{[Formula 12]}$$

wherein Δd' is represented by the following Formula 13:

$$\Delta d' = r(\varphi e + \tan^{-1}(50\text{ mm}/2Dv)) - r(\varphi_e - \tan^{-1}(50\text{ mm}/2Dv))$$ [Formula 13]

wherein
$r(\varphi e + \tan^{-1}(50\text{ mm}/2Dv))$ and $r(\varphi e - \tan^{-1}(50\text{ mm}/2Dv))$ are distances recognized due to the difference in angular luminance to one point on the decorative layer recognized at viewing angles $(\varphi e + \tan^{-1}(50\text{ mm}/2Dv))$ and $(\varphi e - \tan^{-1}(50\text{ mm}/2Dv))$ by the detector and are represented by the following Formula 14 and Formula 15, respectively:

$$r(\varphi_e + \tan^{-1}(50\text{ mm}/2Dv)) = Dv \times \sqrt{f(\varphi e + \tan^{-1}(50\text{mm}/2Dv))/f(\varphi e)}$$ [Formula 14]

$$r(\varphi_e - \tan^{-1}(50\text{ mm}/2Dv)) = Dv \times \sqrt{f(\varphi e + \tan^{-1}(50\text{mm}/2Dv))/f(\varphi e)}$$ [Formula 15]

wherein $f(\varphi e)$, $f(\varphi e + \tan^{-1}(50\text{ mm}/2Dv))$ and $f(\varphi e - \tan^{-1}(50\text{ mm}/2Dv))$ are angular luminances at viewing angles $(\varphi e)$, $(\varphi e + \tan^{-1}(50\text{ mm}/2Dv))$ and $(\varphi e - \tan^{-1}(50\text{ mm}/2Dv))$, respectively.

3. The decorative member of claim 1, wherein a depth parameter value $\Omega_2$ represented by the following Formula 21 in at least a part of the central viewing angle φv from −15° to +15° is 0.3 or more, $$\Omega_2 = |\Delta d'|\text{max}/D_v$$ [Formula 21]

wherein |Δd'|max is the maximum value of Δd' represented by Formula 13:

$$\Delta d' = r(\varphi e + 2\tan^{-1}(50\text{ mm}/2Dv)) - r(\varphi_e - 2\tan^{-1}(50\text{ mm}/2Dv))$$ [Formula 13]

wherein
$\Delta d' = r(\varphi e + 2\tan^{-1}(50\text{ mm}/2Dv))$ and $r(\varphi e - 2\tan^{-1}(50\text{ mm}/2Dv))$ are distances recognized due to the difference in angular luminance to one point on the decorative layer recognized at viewing angles $(\varphi e + 2\tan^{-1}(50\text{ mm}/2Dv))$ and $(\varphi e - 2\tan^{-1}(50\text{ mm}/2Dv))$ by the detector and are represented by the following Formula 14 and Formula 15, respectively:

$$r(\varphi_e + \tan^{-1}(50\text{ mm}/2Dv)) = Dv \times \sqrt{f(\varphi e + \tan^{-1}(50\text{mm}/2Dv))/f(\varphi e)}$$ [Formula 14]

$$r(\varphi_e - \tan^{-1}(50\text{ mm}/2Dv)) = Dv \times \sqrt{f(\varphi e + \tan^{-1}(50\text{mm}/2Dv))/f(\varphi e)}$$ [Formula 15]

wherein $f(\varphi e)$, $f(\varphi e + \tan^{-1}(50\text{ mm}/2Dv))$ and $f(\varphi e - \tan^{-1}(50\text{ mm}/2Dv))$ are angular luminances at viewing angles $(\varphi e)$, $(\varphi e + \tan^{-1}(50\text{ mm}/2Dv))$ and $(\varphi e - \tan^{-1}(50\text{ mm}/2Dv))$, respectively.

4. The decorative member of claim 1, wherein the decorative member has one or more points where an absolute value of a value obtained by dividing a slope of an angular luminance graph according to the central viewing angle φv from −15° to +15° by angular luminance is 0.025 or more, wherein the angle unit is a degree)(°).

5. The decorative member of, claim 1, wherein Dv is 500 mm.

6. The decorative member of claim 5, wherein, when all surfaces of the decorative layer are divided by a unit area having a size of 2.5 mm×2.5 mm, angular luminances of light having a wavelength with a range of 380 nm≤λ≤780 nm emitted from the respective unit areas are the same.

7. The decorative member of claim 5, wherein a difference in height of an upper surface of the decorative layer is greater than 10 μm and is less than 2 mm.

8. The decorative member of claim 1, wherein the light reflection layer, the light absorption layer, or a laminate structure of the light reflection layer and the light absorption layer has dichroism of ΔE*ab>1.

9. The decorative member of claim 1, wherein the light reflection layer has a refractive index at 400 nm of 0 to 8.

10. The decorative member of claim 1, wherein the light reflection layer has an extinction coefficient at 400 nm of more than 0 and not more than 4.

11. The decorative member of claim 1, wherein the decorative member is a decorative film, or a case for a mobile device or an electronic product.

12. The decorative member of claim 1, wherein the decorative member is a decorative film or a case for a mobile device.

13. The decorative member of claim 1, wherein the protrusions have an asymmetrical cross-sectional surface.

14. The decorative member of claim 13, wherein then asymmetrical cross-sectional surface comprises at least two sides, at least one cross-sectional surface of which has a different inclination angle or a different curvature, or which have a different side shape.

15. The decorative member of claim 13, wherein the asymmetrical cross-sectional surface comprises at least two sides having a different inclination angle, and wherein the difference in inclination angle is 30 degrees to 70 degrees.

16. The decorative member of claim 1, wherein the light reflection layer comprises one or more of molybdenum, aluminum or copper, and wherein the light absorption layer comprises one or more of copper oxide, copper nitride, copper oxynitride, aluminum oxide, aluminum nitride, aluminum oxynitride, molybdenum titanium oxynitride, silicon or germanium.

17. The decorative member of claim 1, wherein the light reflection layer has a thickness of 50 nm or more, and the light absorption layer has a thickness of 30 to 500 nm.

18. The decorative member of claim 1, wherein the substrate is a UV-curable resin.

19. A decorative member comprising:
a substrate; and
a decorative layer provided on the substrate,
wherein the decorative layer has a pattern of protrusions arranged in one dimension and a pitch in a one-dimensional direction of the pattern is smaller than 1 mm, or arranged in two dimensions and each pitch in a two-dimensional direction of the pattern is smaller than 1 mm, wherein the protrusions have an asymmetrical structure,
wherein the asymmetrical structure comprises:
an asymmetrical conical shape, wherein (i) the asymmetrical conical shape, when viewed from an upper surface thereof, has a structure with a base and a vertex of the conical shape on a line perpendicular to the base, and the position of the vertex is a point that does not coincide with the center of gravity of the base; or
(ii) the base of the asymmetrical conical shape has an asymmetrical polygonal or elliptical shape,
wherein the decorative layer comprises a light reflection layer provided on the substrate and a light absorption layer provided on the light reflection layer, or a light absorption layer provided on the substrate and a light reflection layer provided on the light absorption layer,
wherein the light reflection layer or the light absorption layer comprises two or more points having different thicknesses, wherein the light reflection layer has a light reflectance of 50% or more, wherein the light absorption layer has a refractive index (n) at 380 nm to 780 nm of 0 to 8, and an extinction coefficient (k) at 380 nm to 780 nm of more than 0 and not more than 4, wherein the light reflection comprises one or more materials selected from indium (In), titanium (Ti), tin (Sn), silicon (Si), germanium (Ge), aluminum (Al), copper (Cu), nickel (Ni), vanadium, (V), tungsten (W), tantalum (Ta), molybdenum (Mo), neodymium (Nb), iron (Fe), chromium (Cr), cobalt (Co), gold (Au) and silver (Ag), an oxide, nitride or oxynitride thereof, or one or more materials of carbon and carbon composites, wherein the light absorption layer one or more materials selected from indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au) and silver (Ag), or an oxide, nitride or oxynitride thereof, wherein, when a direction perpendicular to a plane of the decorative layer is defined as an x-axis, a direction on a surface of the decorative layer is defined as a y-axis, and a central point of a width of the y-axis on the decorative layer is detected using a detector under a condition of standard illuminant D65 in a wavelength range of 380 nm≤λ≤780 nm, an angle formed by a line connecting the center of the detector to the central point of the width of the y-axis on the decorative layer with the x-axis on the x-y axis plane is defined as a central viewing angle φv, a distance from the center of the detector to the central point of the width in the y-axis direction on the decorative layer is defined as Dv, and a depth parameter value $\delta_2$ represented by the following Formula 21 in at least a part of the central viewing angle φv from −15° to +15° is 0.3 or more:

$$\Omega_2 = |\Delta d'|max/D_v \quad \text{[Formula 21]}$$

wherein |Δd'|max is the maximum value of Δd' represented by the following Formula 13:

$$\Delta d' = r(\varphi e + \tan^{-1}(50\ mm/2Dv)) - r(\varphi_e - \tan^{-1}(50\ mm/2Dv)) \quad \text{[Formula 13]}$$

wherein $r(\varphi e + \tan^{-1}(50\ mm/2Dv))$ and $r(\varphi e - \tan^{-1}(50\ mm/2Dv))$ are distances recognized due to the difference in angular luminance to one point on the decorative layer recognized at viewing angles $(\varphi e + \tan^{-1}(50\ mm/2Dv))$ and $(\varphi e - \tan^{-1}(50\ mm/2Dv))$ by the detector and are represented by the following Formula 14 and Formula 15, respectively:

$$r(\varphi_e + \tan^{-1}(50\ mm/2Dv)) = Dv \times \sqrt{f(\varphi e + \tan^{-1}(50mm/2Dv))/f(\varphi e)} \quad \text{[Formula 14]}$$

$$r(\varphi_e - \tan^{-1}(50\ mm/2Dv)) = Dv \times \sqrt{f(\varphi e + \tan^{-1}(50mm/2Dv))/f(\varphi e)} \quad \text{[Formula 15]}$$

wherein f(φe), f(φe+tan$^{-1}$(50 mm/2Dv)) and f(φe−tan$^{-1}$(50 mm/2Dv)) are angular luminances at viewing angles (φe), (φe+tan$^{-1}$(50 mm/2Dv)) and (φe−tan$^{-1}$(50 mm/2Dv)), respectively.

20. A decorative member comprising:
a substrate; and
a decorative layer provided on the substrate,
wherein the decorative layer has a pattern of protrusions arranged in one dimension and a pitch in a one-dimensional direction of the pattern is smaller than 1 mm, or arranged in two dimensions and each pitch in a two-dimensional direction of the pattern is smaller than 1 mm, wherein the protrusions have an asymmetrical structure, wherein the asymmetrical structure comprises:
an asymmetrical conical shape, wherein (i) the asymmetrical conical shape, when viewed from an upper surface thereof, has a structure with a base and a vertex of the conical shape on a line perpendicular to the base, and the position of the vertex is a point that does not coincide with the center of gravity of the base; or (ii) the base of the asymmetrical conical shape has an asymmetrical polygonal or elliptical shape, wherein the decorative layer comprises a light reflection layer provided on the substrate and a light absorption layer provided on the light reflection layer, or a light absorption layer provided on the substrate and a light reflection layer provided on the light absorption layer, wherein the light reflection layer has a thickness of 1 nm or more, and the light absorption layer has a thickness of 5 to 500 nm, wherein the light reflection layer or the light absorption layer comprises two or more points having different thicknesses, wherein the light reflection layer has a light reflectance of 50% or more, wherein the light absorption layer has a refractive index (n) at 380 nm to 780 nm of 0 to 8, and an extinction coefficient (k) at 380 nm to 780 nm of more than 0 and not more than 4, wherein the light reflection comprises one or more materials selected from indium (In), titanium (Ti), tin (Sn), silicon (Si), germanium (Ge), aluminum (Al), copper (Cu), nickel (Ni), vanadium, (V), tungsten (W), tantalum (Ta), molybdenum (Mo), neodymium (Nb), iron (Fe), chromium (Cr), cobalt (Co), gold (Au) and silver (Ag), an oxide, nitride or oxynitride thereof, or one or more materials of carbon and carbon composites, wherein the light absorption layer one or more materials selected from indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au) and silver (Ag), or an oxide, nitride or oxynitride thereof, wherein, when a direction perpendicular to a plane of the decorative layer is defined as an x-axis, a direction on a surface of the decorative layer is defined as a y-axis, and a central point of a width of the y-axis on the decorative layer is detected using a detector under a condition of standard illuminant D65 in a wavelength range of 380 nm≤λ≤780 nm, an angle formed by a line connecting the center of the detector to the central point of the width of the y-axis on the decorative layer with the x-axis on the x-y axis plane is defined as a central viewing angle φv, and the decorative member has one or more points where an absolute value of a value obtained by dividing a slope of an angular luminance graph according to the central viewing angle φv from −15° to +15° by angular luminance is 0.025 or more, wherein the angle unit is a degree (°).

* * * * *